(12) United States Patent
Cleeves

(10) Patent No.: US 10,977,968 B2
(45) Date of Patent: Apr. 13, 2021

(54) APPARATUS AND METHODS FOR DISPLAYING AND STORING A BANNER OR ADVERTISEMENT ON A HORIZONTAL WIND TURBINE

(71) Applicant: Patrick V. Cleeves, Alexandria, VA (US)

(72) Inventor: Patrick V. Cleeves, Alexandria, VA (US)

(*) Notice: Subject to any disclaimer, the term of this patent is extended or adjusted under 35 U.S.C. 154(b) by 567 days.

(21) Appl. No.: 15/727,459

(22) Filed: Oct. 6, 2017

(65) Prior Publication Data

US 2018/0102073 A1 Apr. 12, 2018

Related U.S. Application Data

(60) Provisional application No. 62/407,165, filed on Oct. 12, 2016.

(51) Int. Cl.
*G09F 17/00* (2006.01)
*G09F 19/22* (2006.01)
(Continued)

(52) U.S. Cl.
CPC .............. *G09F 17/00* (2013.01); *F03D 9/00* (2013.01); *G09F 19/226* (2013.01); *F03D 1/00* (2013.01);
(Continued)

(58) Field of Classification Search
CPC .................. G09F 17/00; G09F 19/226; G09F 2017/0025; F03D 9/00; F03D 1/00;
(Continued)

(56) References Cited

U.S. PATENT DOCUMENTS

| 4,546,718 A | 10/1985 | Schwarz |
|---|---|---|
| 8,720,836 B2 | 5/2014 | Hogan |

(Continued)

FOREIGN PATENT DOCUMENTS

| CN | 101003354 A | 7/2007 |
|---|---|---|
| CN | 201181558 Y | 1/2009 |

(Continued)

OTHER PUBLICATIONS

Sharen M. Belen et al.; "Implementation of Microcontroller-Based Automatic Rolling Up/Down of Billboard Using an Anemometer and a Master Switch in LPU-Laguna"; LPU-Laguna Journal of Engineering and Computer Studies; Sep. 2015; pp. 122-137; vol. 3 No. 1.

(Continued)

*Primary Examiner* — Jacob M Amick
*Assistant Examiner* — Charles Brauch
(74) *Attorney, Agent, or Firm* — Andrew D. Fortney; Central California IP Group, P.C.

(57) ABSTRACT

A kit for securing advertising space to a horizontal wind turbine at a blade height of the horizontal wind turbine, a horizontal wind turbine including the kit, and methods of making and using the same are disclosed. The horizontal wind turbine has blades on a blade side of the turbine, a non-blade side opposite the blade side of the turbine, a tower and a nacelle capable of turning during normal function. The kit comprises (i) an advertisement and/or advertising space and (ii) a structure that facilitates the turning of a base of the advertisement and/or advertising space to mirror the nacelle. The advertisement and/or advertising space is on the non-blade side of the horizontal wind turbine. The base of the advertisement and/or the advertising space is joined, connected or affixed to the tower and/or the nacelle and can store a plurality of ads in the housing.

20 Claims, 21 Drawing Sheets

(51) Int. Cl.
*F03D 9/00* (2016.01)
*F03D 80/80* (2016.01)
*F03D 1/00* (2006.01)

(52) U.S. Cl.
CPC .......... *F03D 80/80* (2016.05); *F05B 2220/25* (2013.01); *F05B 2240/221* (2013.01); *G09F 2017/0025* (2013.01); *Y02E 10/72* (2013.01)

(58) Field of Classification Search
CPC .... F03D 80/80; Y02E 10/72; F05B 2240/221; F05B 2220/25
See application file for complete search history.

(56) References Cited

U.S. PATENT DOCUMENTS

| | | |
|---|---|---|
| 9,103,321 B1 | 8/2015 | Bardia |
| 9,111,469 B2 | 8/2015 | Cook et al. |
| 9,388,792 B2 | 7/2016 | Baker |
| 2003/0201647 A1 | 10/2003 | Makino et al. |
| 2005/0050779 A1* | 3/2005 | Tsao ..................... G09F 9/33 |
| | | 40/544 |
| 2005/0188571 A1 | 9/2005 | Wilson |
| 2009/0090895 A1* | 4/2009 | Hogan, Jr. ............. A47G 7/041 |
| | | 254/266 |
| 2012/0242084 A1 | 9/2012 | Agtuca |
| 2014/0003943 A1 | 1/2014 | Valero Lafuente |
| 2014/0318007 A1 | 10/2014 | Hogan |
| 2016/0086523 A1 | 3/2016 | Heiter |

FOREIGN PATENT DOCUMENTS

| | | | |
|---|---|---|---|
| CN | 202451377 U | 9/2012 | |
| EP | 1154155 A2 * | 11/2001 | ......... G09F 15/0087 |
| EP | 1154155 A2 | 11/2001 | |
| EP | 2219170 A2 | 8/2010 | |
| JP | 2004211862 A * | 7/2004 | ............ F16C 19/163 |
| JP | 3155427 U * | 11/2009 | |
| WO | WO-2014060185 A1 * | 4/2014 | ............... B63G 7/06 |

OTHER PUBLICATIONS

Arel M. Abalos et al; "Wind Sensitive Auto-Controlled Poster Board"; The Countryside Development Research Journal; Samar State University; Catabalogan City, Philippines (date unknown); pp. 61-68.

* cited by examiner

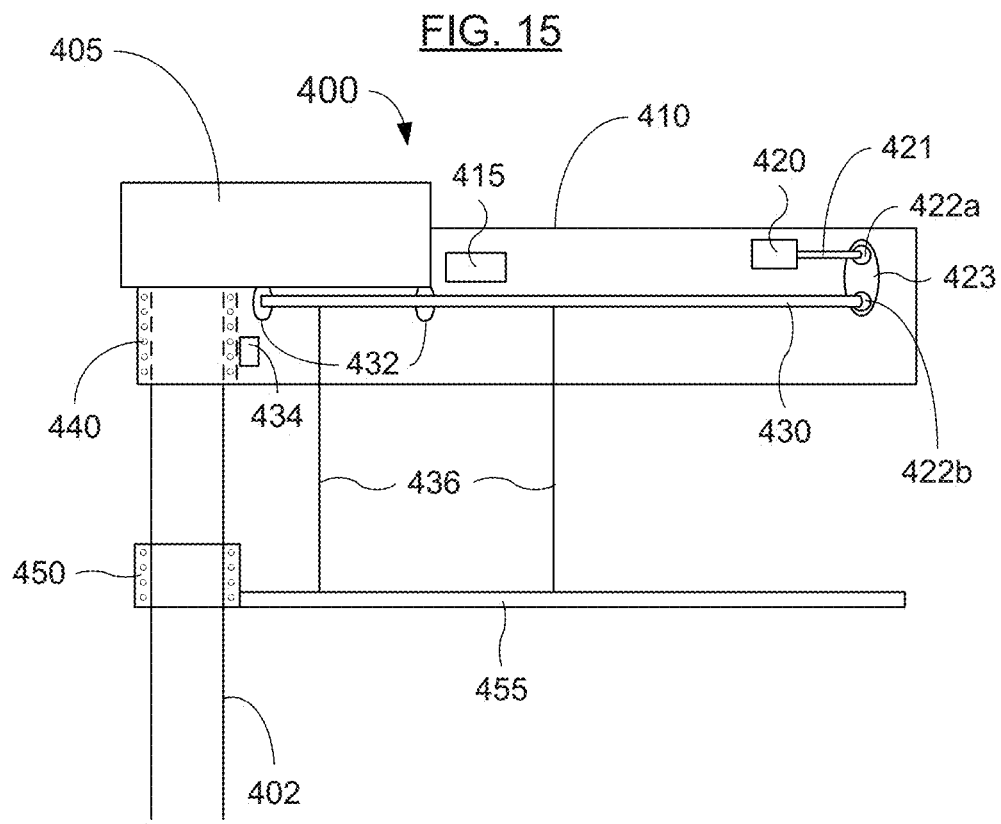
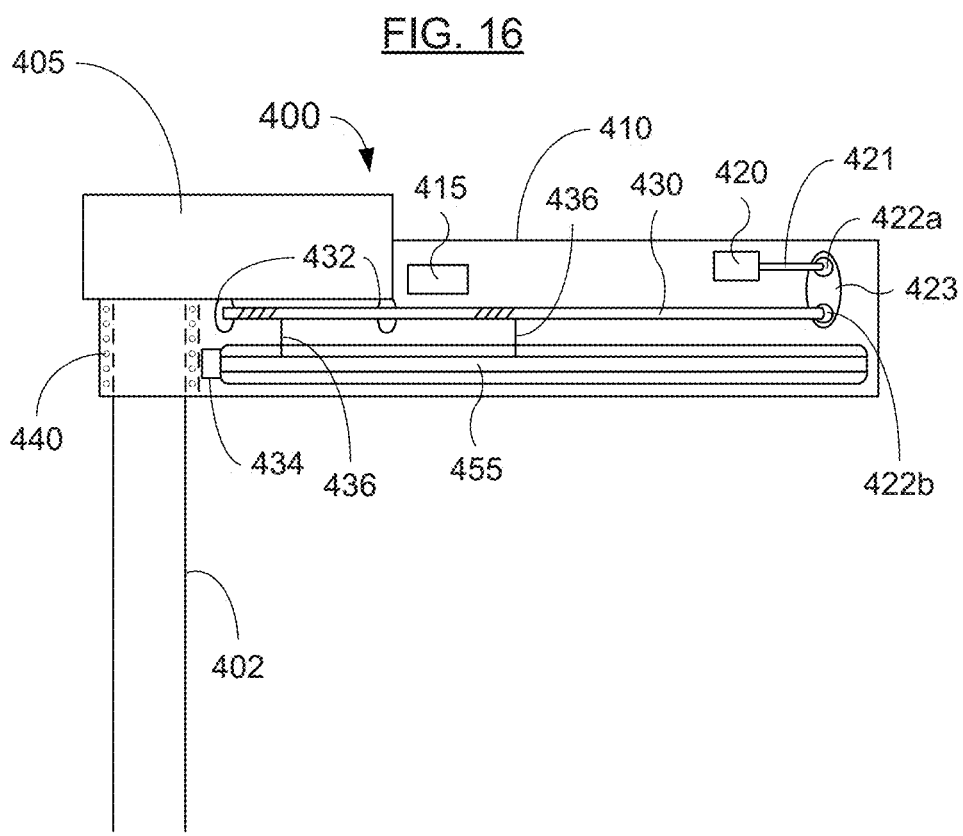

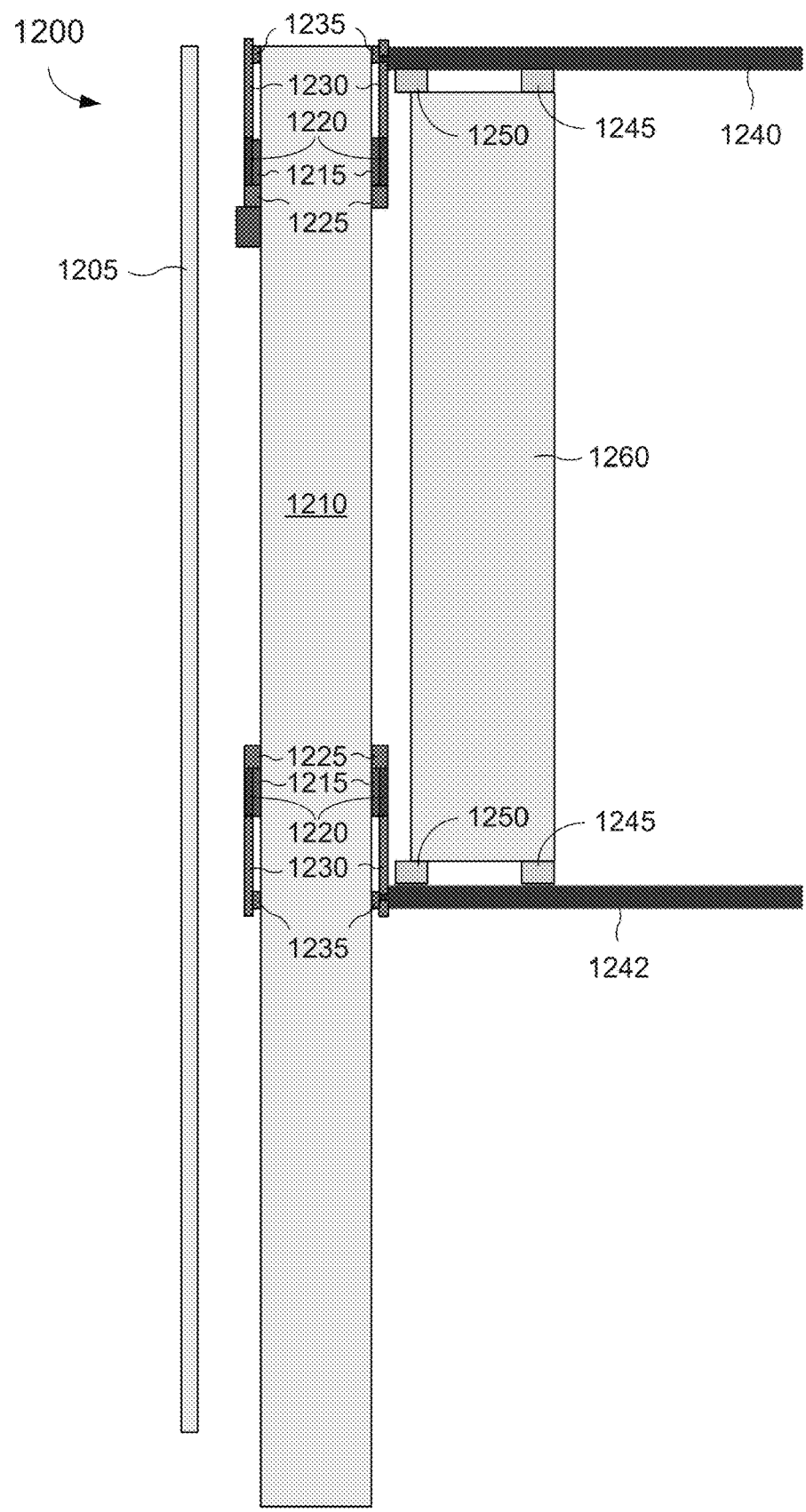

APPARATUS AND METHODS FOR DISPLAYING AND STORING A BANNER OR ADVERTISEMENT ON A HORIZONTAL WIND TURBINE

CROSS REFERENCE TO RELATED APPLICATION(S)

This application claims the benefit of U.S. Provisional Patent Application No. 62/407,165, filed on Oct. 12, 2016, incorporated herein by reference as if fully set forth herein.

FIELD OF THE INVENTION

The present invention relates to apparatuses, kits and methods for safely displaying relatively large and/or up-tower advertisements with dimensions on the order of 20 meters by 40 meters or more in size on an industrial horizontal wind turbine, or on the order of the length of a blade on a smaller turbine (see FIGS. 1 and 9). These sizes develop tremendous forces in cross wind conditions, hence the need for the ability to deflect the load and/or quickly retract the advertisement to a safe place or have other means of limiting drag if the retraction were to fail. A simple structure that can be, for example, 5 meters by 5 meters can be affixed under the nacelle to keep it away from the turbine blades with the ability to deflect, but the smaller size does not require retraction (e.g. it may employ only the drag-limiting safety features). Lights can be added to any size of advertisement to ensure that the ad can be seen at night. These advertisements can be installed above or below the nacelle.

SUMMARY OF THE INVENTION

Embodiments of the present invention relate to a kit for securing advertising space to a horizontal wind turbine at blade height of the horizontal wind turbine, a horizontal wind turbine, and methods of making and using the kit. The horizontal wind turbine has blades on a blade side of the turbine, a non-blade side opposite the blade side of the turbine, a tower and a nacelle capable of turning during normal function. The kit comprises (i) an advertisement and/or advertising space, (ii) a base joined, connected or affixed to the tower and/or the nacelle, and (iii) a structure that facilitates turning of the base to reduce or minimize the likelihood of the advertisement and/or advertising space entering the space in which the blades rotate. For example, the structure can facilitate turning of the base with the nacelle, but allow the ad to flex away from the center line of the nacelle without impacting the function (e.g., rotation) of the blades. The advertisement and/or advertising space is on the non-blade side of the horizontal wind turbine. The kit may be configured to store the advertisement in the horizontal wind turbine or in or to a housing and/or bracket attached to the horizontal wind turbine.

The kit may further comprise at least one rail or structural extension extending from the tower and/or the nacelle, and/or at least one roller or drum around which the advertisement is rolled and/or one or more cables attached to the advertisement are coiled. The rail(s) or structural extension(s) is/are configured to secure a first edge of the advertisement. The roller(s) or drum(s) are adapted to be connected or secured directly or indirectly to one or more of the rail(s), the structural extension(s), the nacelle and/or the tower of the horizontal wind turbine. The advertisement may be rolled around the roller(s) or drum(s), and/or one or more cables attached to the advertisement may be coiled around the roller(s) or drum(s). Alternatively, the advertisement may be gathered or bundled to, under, on and/or around the roller(s) or drum(s). Additionally or alternatively, the kit may further comprise at least one motor or other electric, mechanical or hydraulic mechanism configured to (i) unfurl or deploy the advertisement in a first direction along one or more of the rail(s) or structural extension(s) and (ii) roll or undeploy the advertisement in a direction opposite to the first direction.

In some embodiments, the rail or structural extension comprises a C-rail, and the kit further comprises a wheel, guide or other mechanism attached to the first edge of the advertisement, configured to secure the advertisement to the C-rail and securely move in the C-rail. In other or further embodiments, the rail or structural extension is horizontal, and the kit is configured to store the advertisement in or near the tower. Alternatively, the rail or structural extension is vertical, and the kit is configured to store the advertisement in or near the nacelle.

In some embodiments, the motor or other electric, mechanical or hydraulic mechanism comprises the motor. For example, the motor may be configured to fit in or near the nacelle. In one example, the roller or drum comprises the roller, the roller is configured to fit in the nacelle of the horizontal wind turbine, the advertisement is rolled and unrolled around the roller, and the motor drives the roller. Alternatively, the roller may be configured to fit in the housing and/or to a bracket attached to the tower. In such an alternative, the advertisement is rolled and unrolled around the roller, and the motor drives the roller. In another alternative example, the roller or drum comprises the drum, the cable(s) are coiled and uncoiled around the drum, and the motor drives the drum. In a more specific example, the kit comprises two or more cables attached to the advertisement and at least one cable guide per cable. Each cable guide may be configured (i) for placement in the nacelle and/or (ii) to guide the cable from the advertisement to a corresponding roller or drum. Hydraulic or electric pistons can also be used to unfurl/deploy and stow/undeploy the advertisement.

In some embodiments, the structural extension is horizontal, and the kit is configured to store the advertisement in the tower or in or to a housing and/or bracket attached to the tower. Alternatively, the structural extension is vertical, and the kit is configured to store the advertisement at the top of the tower (e.g., in/near the nacelle or in or to a housing and/or bracket attached to (directly or indirectly) or near the nacelle).

In some embodiments, the kit may further comprise a second rail or structural extension configured to secure a second edge of the advertisement. The second rail or structural extension may be configured to fit along the nacelle. The second edge of the advertisement may be opposite from the first edge. Such a kit may comprise first and second motors respectively configured to fit in the first and second rails or structural extensions. The first and second motors may be configured to roll and unroll the advertisement around one or more rollers or drums.

In some embodiments, the advertisement may comprise a material selected from a plastic or a cloth. For example, when the advertisement comprises the plastic and/or the cloth, the plastic and/or the cloth may comprise a plurality of vertical or horizontal stitches configured to break or separate when exposed to a force or pressure at or above a predetermined threshold force or pressure. Alternatively or additionally, the advertisement may comprise solid panels of metal, wood, plastic, glass, or composites thereof. The solid panels generally have or provide sufficient pressure to resist the force of the wind to a certain point and rotate independently, in the manner similar to the above stitches.

In various embodiments, the kit further comprises one or more sets of bearings configured to allow the base to rotate around the tower or around a line or vertical rail along the tower. In other or further embodiments, the structure that facilitates turning of the base with the nacelle comprises a plurality of brackets attached to one or more structures of or in the horizontal wind turbine. The brackets are generally configured to secure the advertisement to the horizontal wind turbine. In one example, each of the plurality of brackets is attached to the nacelle or one or more structures on or in the nacelle. These structures can flex away from the center line of the nacelle without hitting the blades to reduce the drag of a cross wind.

In various embodiments, the kit further comprises a housing. The housing may be oriented vertically, to store and display one or a plurality of ads that are displayed and retracted horizontally, or oriented horizontally, to store and display one or a plurality of ads that are displayed and retracted vertically.

Another aspect of the present invention relates to a horizontal wind turbine, comprising a plurality of blades configured to rotate a shaft upon application of a wind force, a nacelle configured to house the shaft and turbine, a tower configured to support the plurality of blades and the nacelle, and the present kit, installed in and/or on the horizontal wind turbine. In various embodiments, the horizontal wind turbine may further comprise (i) a vertical guide or rail along the tower and/or (ii) a locking mechanism configured to secure one or more of the at least one rail or structural extension in and/or to the tower and/or the vertical guide or rail. The vertical guide or rail may be configured to secure the advertisement to the tower as the advertisement is raised or lowered along the tower. The locking mechanism may be further configured to prevent one or more of the rail(s) or structural extension(s) from falling below a set height along the tower.

A further aspect of the present invention relates to kit for raising and optionally lowering an advertisement on a horizontal wind turbine, comprising the present kit, a plurality of raising cables, one or more mechanisms configured to secure at least one of the advertisement, the rail(s) or structural extension(s), and the roller(s) or drum(s) to a tower of the horizontal wind turbine, and a locking mechanism. The raising cables have a length sufficient to be attached to both (i) the advertisement when the advertisement is on the ground and to (ii) a shaft, one or more pulleys, or the roller or drum in or on a nacelle of the horizontal wind turbine. The locking mechanism is configured to secure one or more of the rail(s) or structural extension(s) in and/or to the tower and prevent the rail(s) or structural extension(s) from falling below a set height along the tower. The locking mechanism is installable in and/or on the horizontal wind turbine.

The kit for raising and optionally lowering the advertisement may further comprise a cage, cart or other operator housing configured to safely carry an operator and advertisements up the tower as the kit ascends/descends the tower. In other or further embodiments, the mechanism(s) configured to secure at least one of the advertisement, the rail(s) or structural extension(s), and the roller(s) to the tower comprises a plurality of belts secured around the tower. In such embodiments, the plurality of belts may have (i) a cinching mechanism for adjusting a diameter of the belt as the belt goes up or down the tower and/or (ii) bearings therein configured to allow the advertisement (alone or in combination with the more mechanism[s], the rail[s] or structural extension[s], and/or the roller[s]) to track the horizontal alignment of the horizontal wind turbine as the advertisement ascends or descends the tower.

In some embodiments of the kit for raising and optionally lowering the advertisement, the locking mechanism may comprise one or more solenoids configured to hold the advertisement to a vertical rail or guide along a height of the tower. In other or further embodiments, the locking mechanism may further comprise a ramp, plate or other fall-breaking mechanism configured to prevent the rail(s) or structural extension(s) from falling below a set height along the tower. The lock can also be released, so that in the extreme case (e.g., where is total failure), the whole structure can rapidly descend the tower to save some or all of the structure and/or the wind turbine.

BRIEF DESCRIPTION OF THE DRAWINGS

FIG. 15 is a diagram showing a side view of a wind turbine 400 in which the housing and ad roll are in the loading process from/to the ground. The ad and support cage 455 are in mid-ascent along the tower 402.

FIG. 16 is a diagram showing the storage of the advertisement up-tower.

FIG. 32 is a side view of the horizontal wind turbine of FIGS. 31A-D without the stored advertisements or housing.

DETAILED DESCRIPTION

Figure 1:
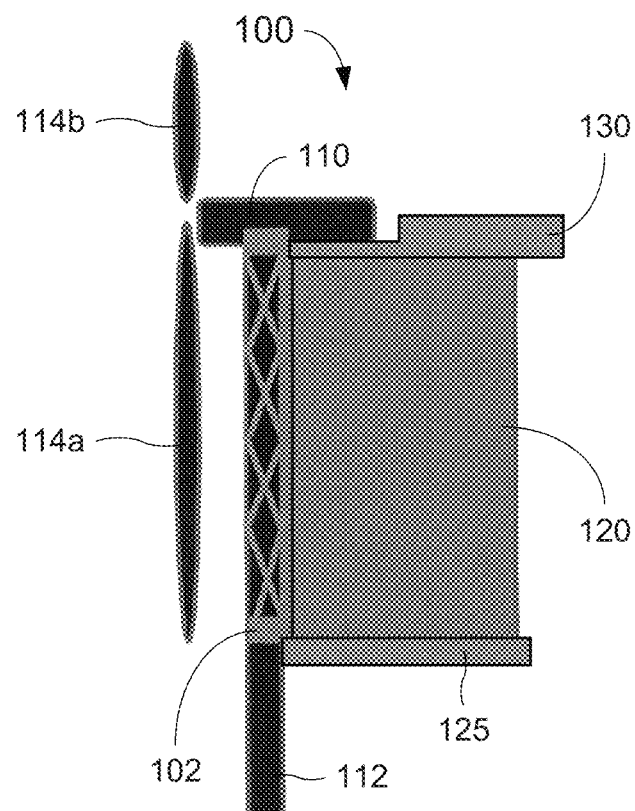
FIG. 1 is a general design of a fully deployed advertisement.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

In the present disclosure, the terms "advertisement," "ad," "roll," "display" and "banner" may be used interchangeably, and may generally refer to a physical object on which text and/or graphics are placed, shown or presented, generally in two dimensions or substantially two dimensions. Use of one such term herein generally includes the others, unless the context of the use clearly indicates otherwise. Furthermore, the terms "support", "structure", "boom," "rail" and "bar" may be used interchangeably, and the use of one such term herein generally includes the others, unless the context of the use clearly indicates otherwise. The term "advertisement space" and grammatical variations thereof may generally refer to the added physical space for an advertisement, which may be defined by the structures that hold the advertisement in place or that secure the advertisement to the wind turbine.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

A Support Structure that Allows an Added Advertisement (e.g., 120, 220, 445, 545, 625, 950, 1040 or 1260) to be Displayed on a Horizontal Wind Turbine (e.g., 100, 200, 300, 400, 500, 600, 700, 800, 900, 1000, 1100 or 1200) at Blade Height The present support structure may include, but is not limited to one or more of the following examples.

EXAMPLE 1

Figure 2:
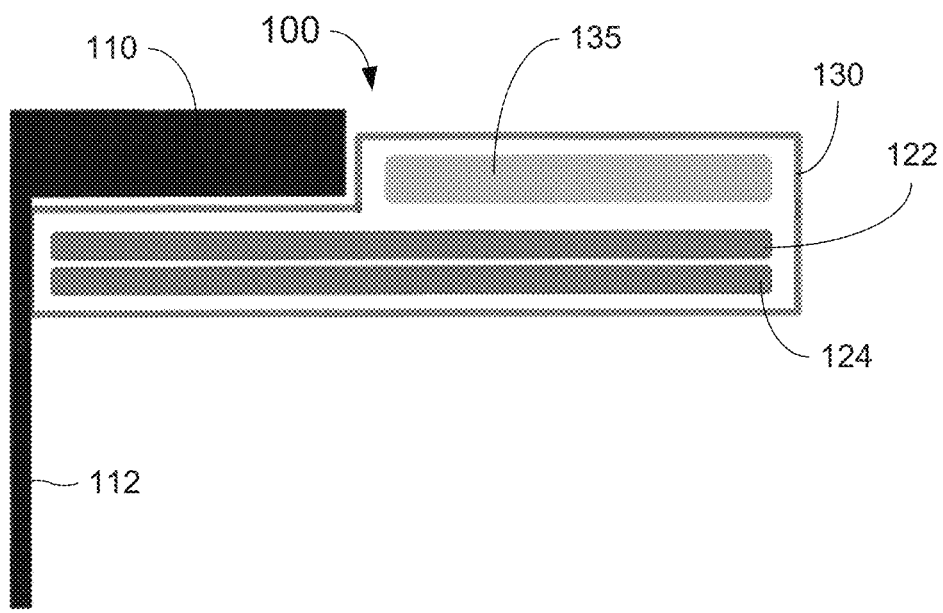
FIG. 2 is a diagram showing the potential of the present system to store more than one advertisement in the housing so that a new advertisement does not need to be loaded from the ground every time.
Figure 11:
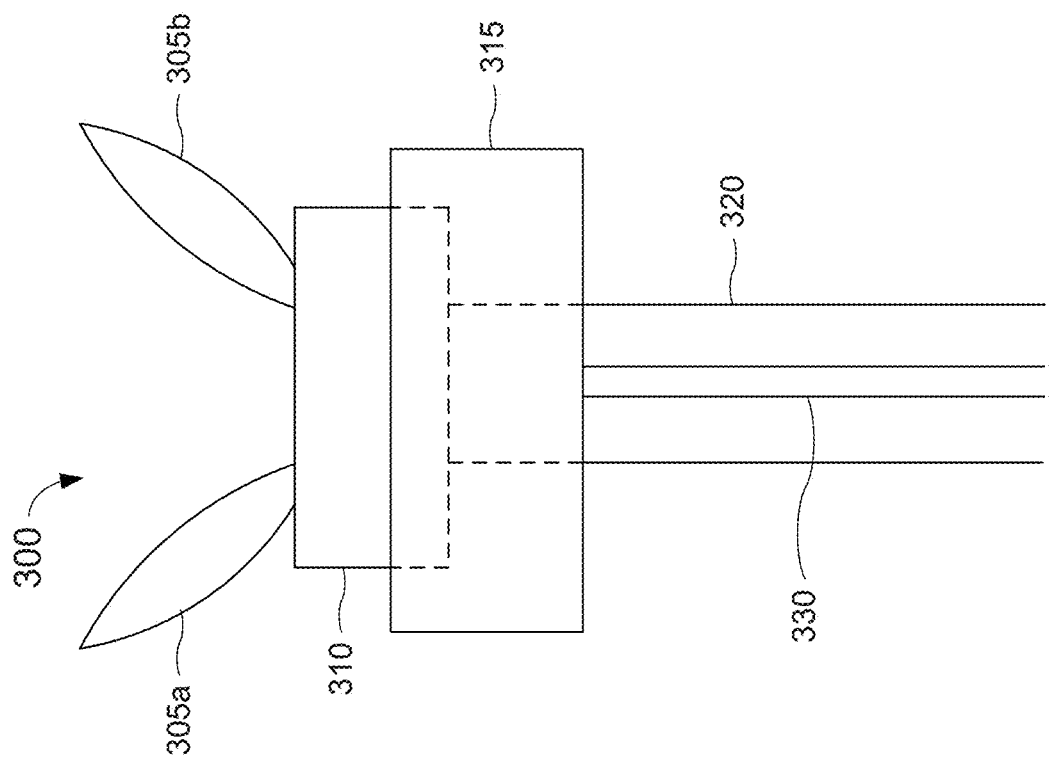
FIG. 11 is a view of the space from the opposite side of the blades for Examples 1 and 2.
Figure 12:
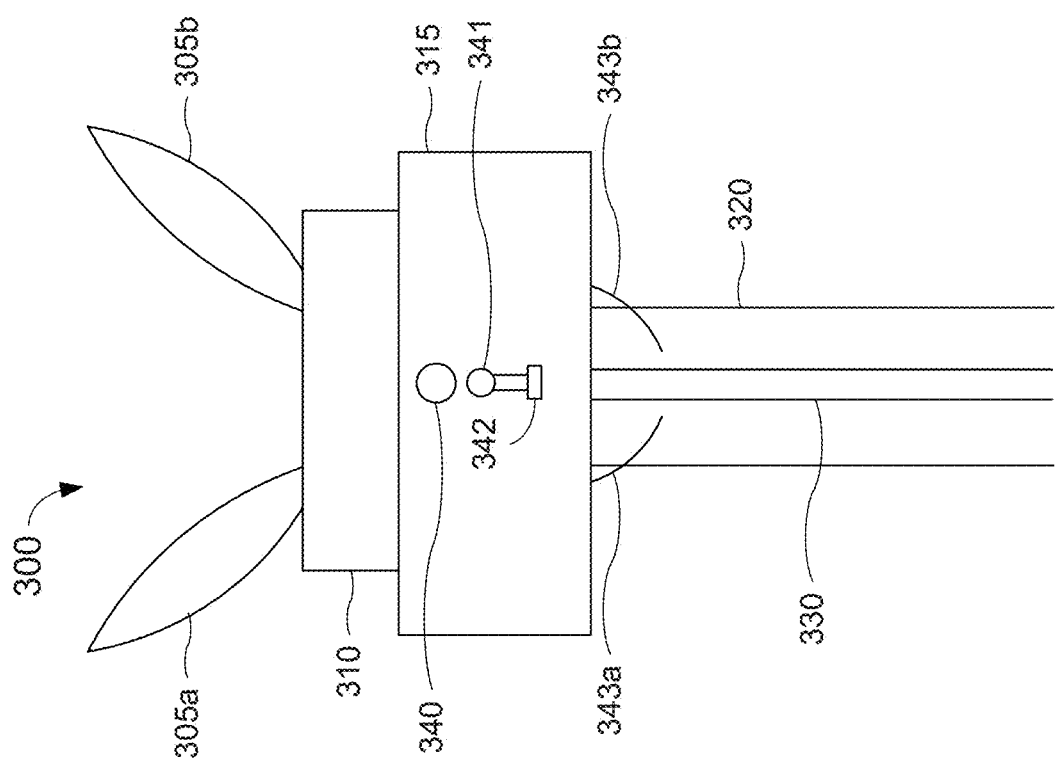
FIG. 12 is a diagram of the present system including bay doors, internal equipment including a motor 340, and a lock 342/341.
Figure 14:
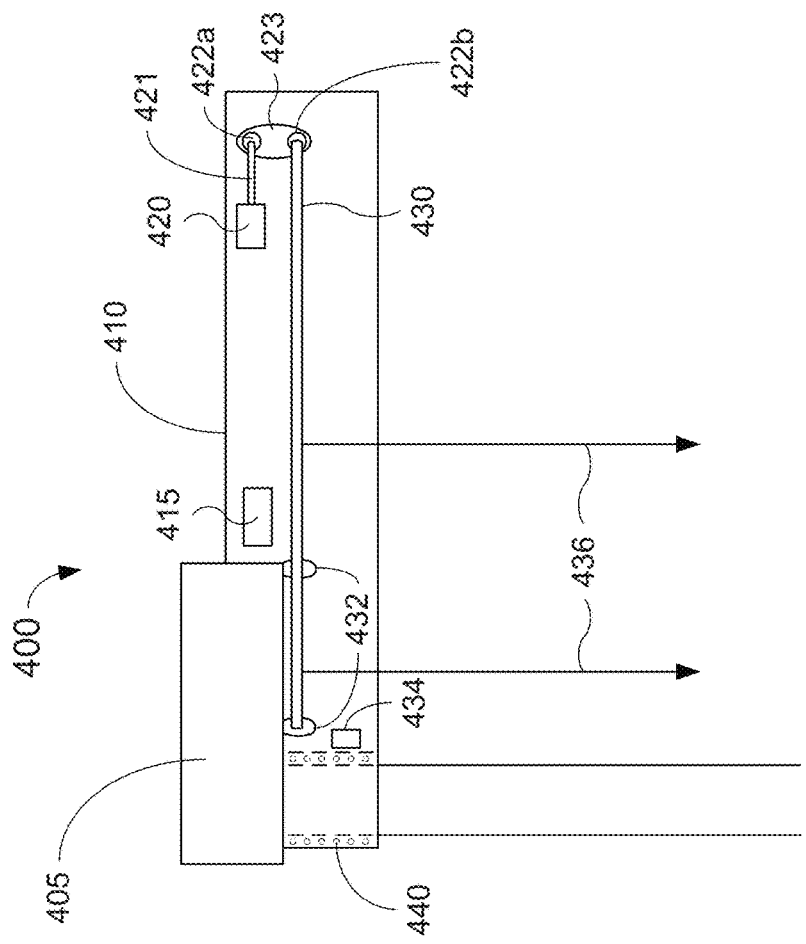
FIG. 14 is a diagram showing the housing 410 affixed to nacelle 405 during the loading of an advertisement from/to the ground, including a controller 415, motor 420, and bearings and bearing support 440 around the top of the tower.
Figure 13:
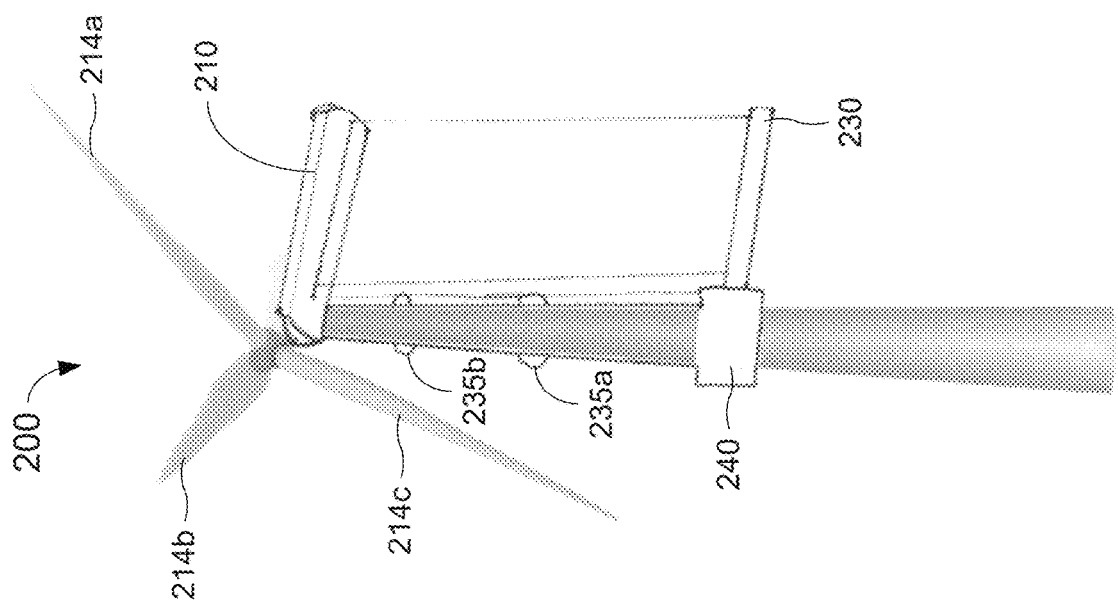
FIG. 13 is a perspective view of a horizontal wind turbine with an advertisement (that can rotate around the tower using bearings 235*a-b*) deployed vertically from the nacelle. The housing 210 and components therein are shown in greater detail in FIGS. 4-9, the function of the lock 240 is shown in FIG. 26 and described with respect to FIG. 26, and components for housing and deploying/undeploying the ad are shown in more detail in FIGS. 7-8 and 14-17.

A structure 130, 102, or 125 in FIGS. 1-2 or 315 in FIG. 11-12 that can be mounted to the bottom/top of the nacelle 110, 310 of a horizontal axis wind turbine 100, 300, ensuring that the banner or ad 120 moves in reference to the nacelle 110, 310 (see FIGS. 1, 2, 11 and 12, the banner is not shown in FIGS. 11-12). In FIG. 1, the structure 130 house mechanical equipment, and structure 102 aligns the structures 125, 130 together. FIG. 2 shows mechanical equipment 135 for raising and lowering first and second ads 122, 124 in a housing 130 configured for ad stowage close to or at the top of the tower 112 (e.g., in high, multi-directional wind conditions). FIGS. 11-12 show a track 330 extending along the tower 320 from a housing 315 that contains a motor 340, cable reel 341 and lock 342. The structure 125, 330 may inhibit or prevent the banner 120 from striking the blades 114a-b, 305a-b. Doors 343a-b enclose the housing 315 in bad weather and open to allow the ad to be displayed in good weather.

Figure 5:
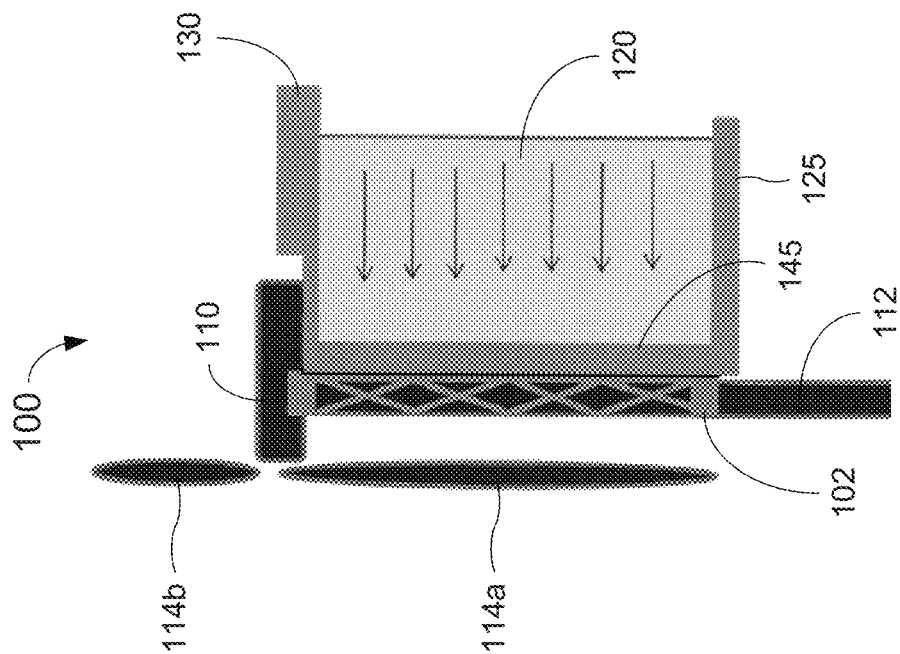
FIG. 5 is a diagram showing a horizontal undeployment or retraction of the advertisement.
Figure 6:
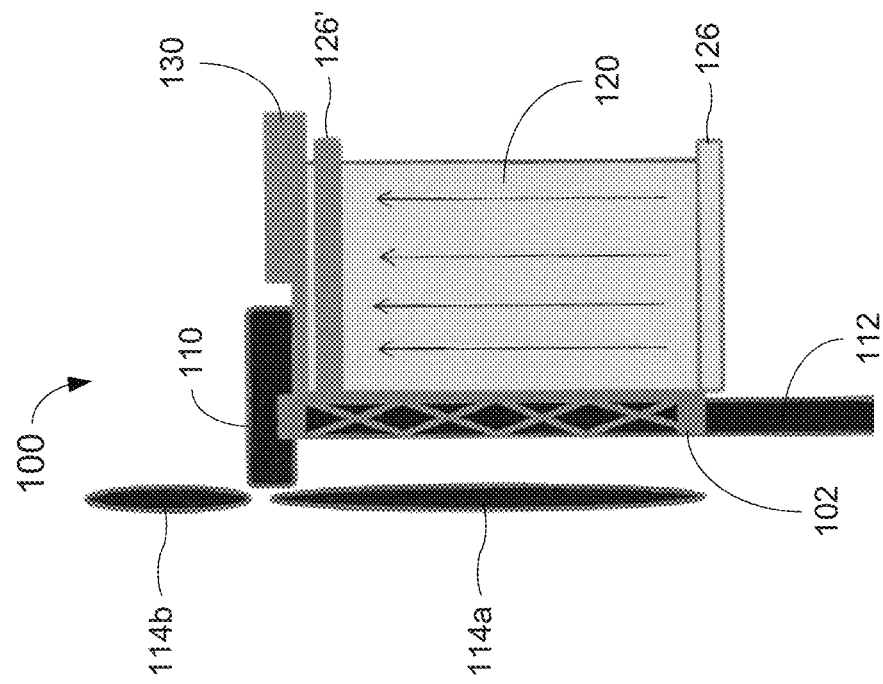
FIG. 6 is a diagram showing a vertical undeployment or retraction of the advertisement. This example shows the lower support 126 moving with the bottom of the ad. Alternately, the structural component 126 can stay in a fixed position (e.g., height along the tower), and only the ad is brought to the top.
Figure 27A:
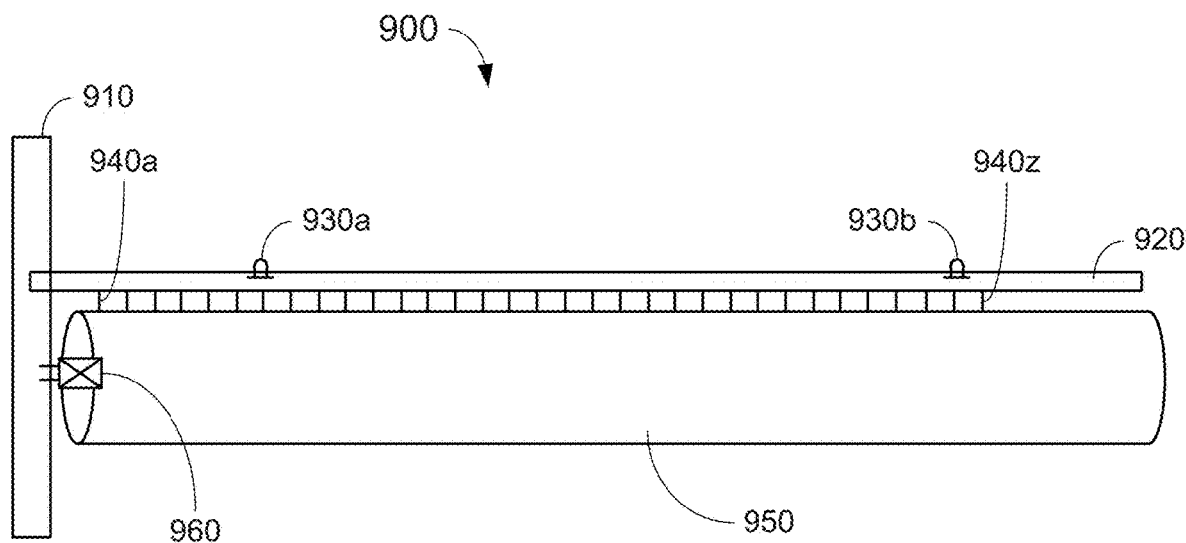
FIGS. 27A-C are diagrams showing an ad roll that uses a motor in the lower boom to roll the advertisement from the bottom in the horizontal layout (Example 1)
Figures 27B, 27C:
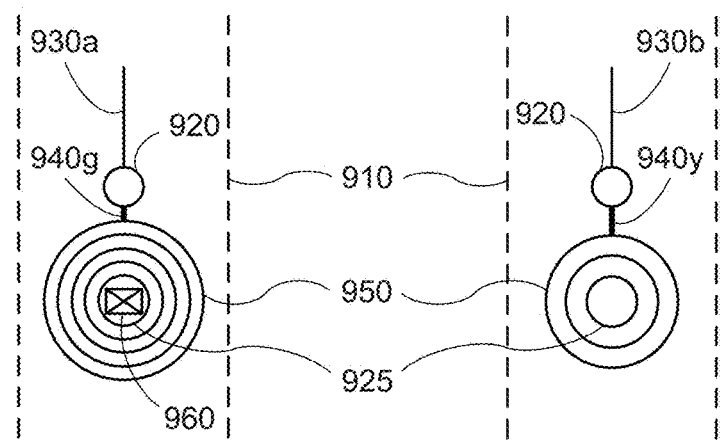

Additional structural rigidity for the ad 120 may be provided by the ad roll 925, 920 (FIGS. 27A-C). With a large banner, the advertisement 120 is guided and supported by a rigid structure 125 or 126, 130 on at least 2 opposite sides (see FIGS. 5 and 6). In FIG. 6, the structure 126 is raised with the advertisement 120 (e.g., to position 126') when the advertisement 120 is raised. During deployment (see FIGS. 16-17), the top of the ad is locked in using a locking mechanism 142b (see FIG. 8) to secure the ad roll 920. Optional locking mechanisms 142a and 142d provide support and direction for the lower part of the ad 120 (e.g., if there are multiple ads). Optional locking mechanism 142c provides additional structural support if the ad 920 is sufficiently large to benefit from it or require it. The lower bar 455 goes down the tower track 450 and is locked to the bottom for rigidity and direction using 240 in FIG. 9. Alternatively, a fixed and/or extended pole or bar 125 or 126 allows the lower end of the banner 120 to be rigidly secured on the vertical plane, but is able to mirror the movements of the nacelle 110 on the horizontal plane. Such fixed and/or extended poles or bars may provide more holding power than locks such as stopping mechanism (e.g., lock) 144 and lock 240. The lower support 125 or 126 is either fixed in a vertical position, moving around the pole or tower 112 as the nacelle 110 moves (see FIG. 5), or is raised with the banner 120 in inclement weather to the structure 130 added to the nacelle 110 (see FIG. 6).

EXAMPLE 2

This structure may be capable of holding any medium of advertising that it can support for any duration of time. Any material that is durable enough to withstand the weather and not be damaged in high winds can be used to display advertisements on a wind turbine. This material may include printed cloth, plastics that can be rolled up, or solid panels of metal, wood, plastic, glass, or composites such as e-reader panels and LED screens that slide together in bad weather. For example, the design shown in FIG. 11 works on any horizontal wind turbine with either the blades up wind or down wind of the tower. The housing for Examples 1 and 2 may be more weather resistant if it has bay doors 343a-b (FIG. 12) like those found in bomber airplanes. The doors (regardless of design) open during the deployment of the advertisement and close when the advertisement is stored.

EXAMPLE 3

The vertical structure 102, 330 that links the two horizontal elements 125/126, 130 of the banner carrier resists torsion to keep the lower support element 125/126 aligned with the nacelle 110 and/or on the non-blade side of the tower 112 (e.g., behind the blades 114a-b). The upper structure 130, 315 can be attached to the nacelle 110, 310 directly or in its own housing to facilitate being able to flex in reference to the nacelle, as well as for keeping the ad 120 away from the blades 114a-b.

EXAMPLE 4

Figure 7:
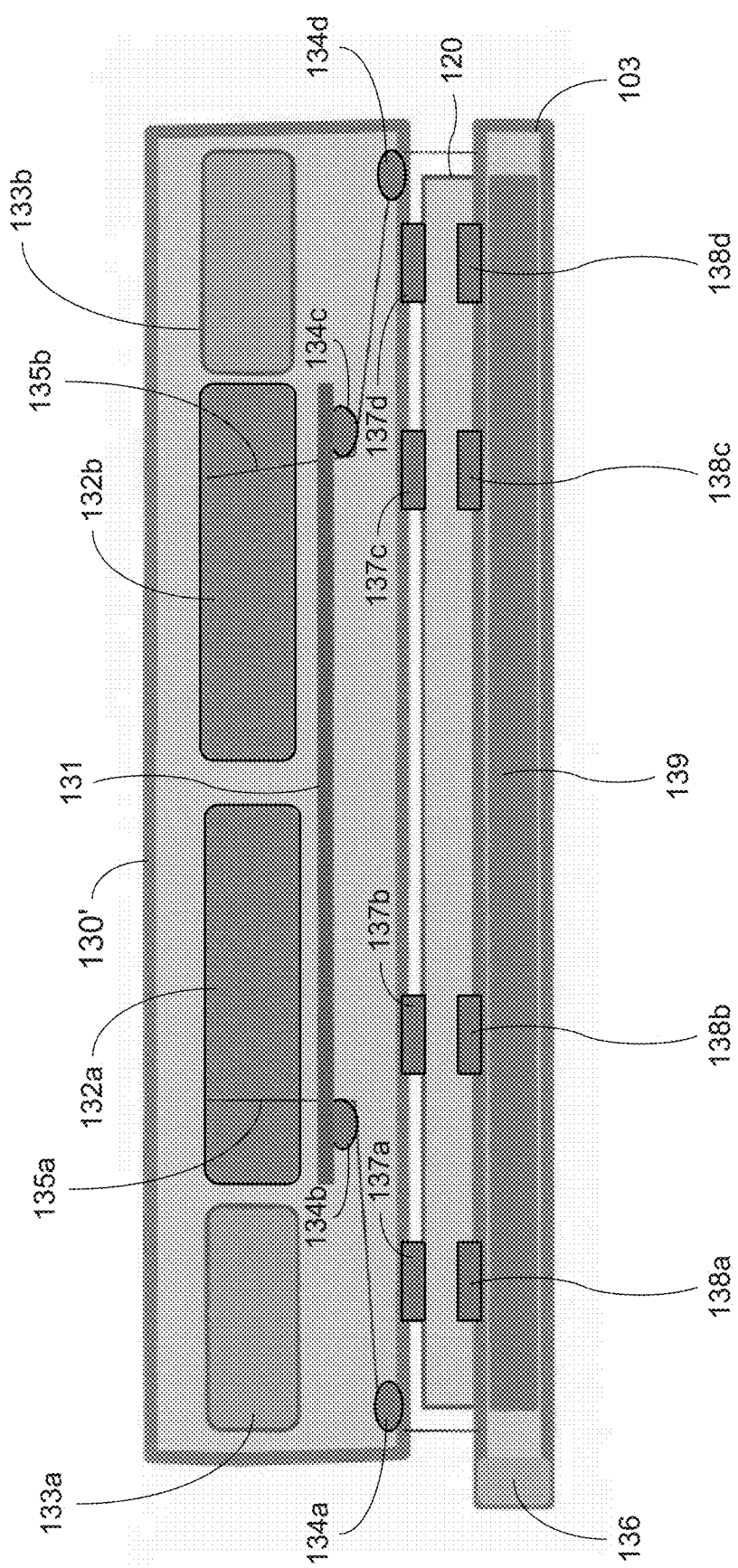
FIG. 7 is a diagram showing an exemplary system for vertical deploying and undeploying an ad.

The system 130' that deploys and undeploys the advertisement 120 up the tower 112 can correct the orientation of the advertisement 120 during those process using physical barriers and/or electronic monitoring (see FIG. 7). FIG. 7 shows motor and motor control equipment 133a-b, cable drums 132a-b, cable guide rail 131, cable guides 134a-d, locks 137a-d and 138a-d, the ad or ad space 120, a down-turbine rail runner 136, an ad spinner 139, cable(s) 135a-b, and housing 130'.

EXAMPLE 5

Figure 29:
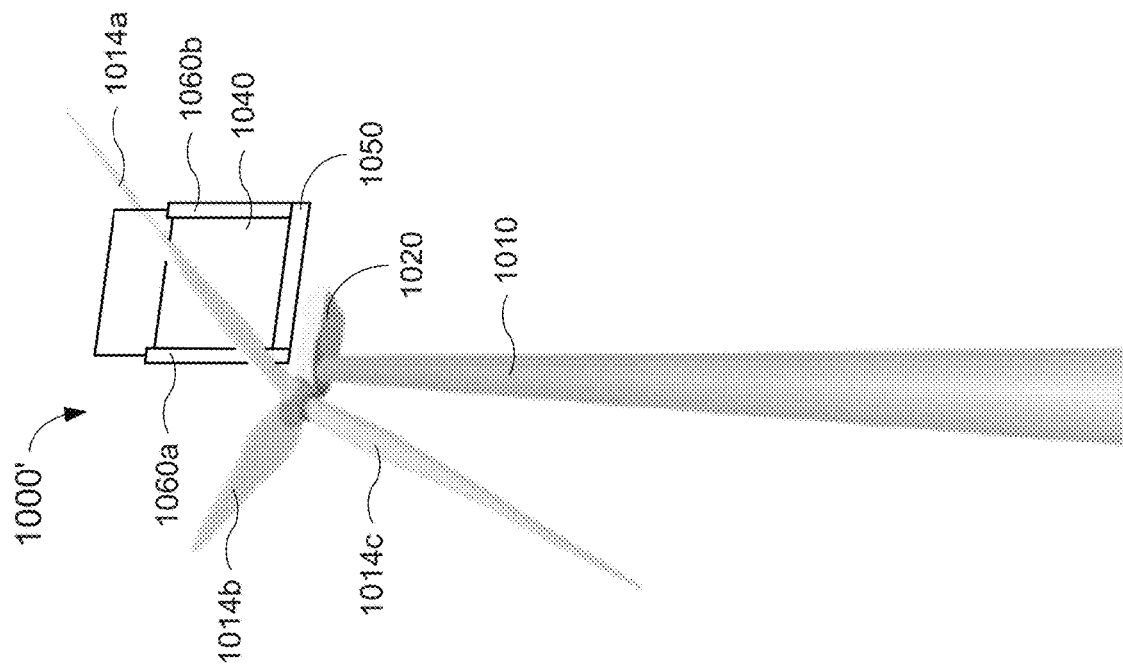
FIG. 29 is a diagram showing an alternate mechanism for operating the advertisement above the nacelle through the use of hydraulic cylinders.
Figure 28:
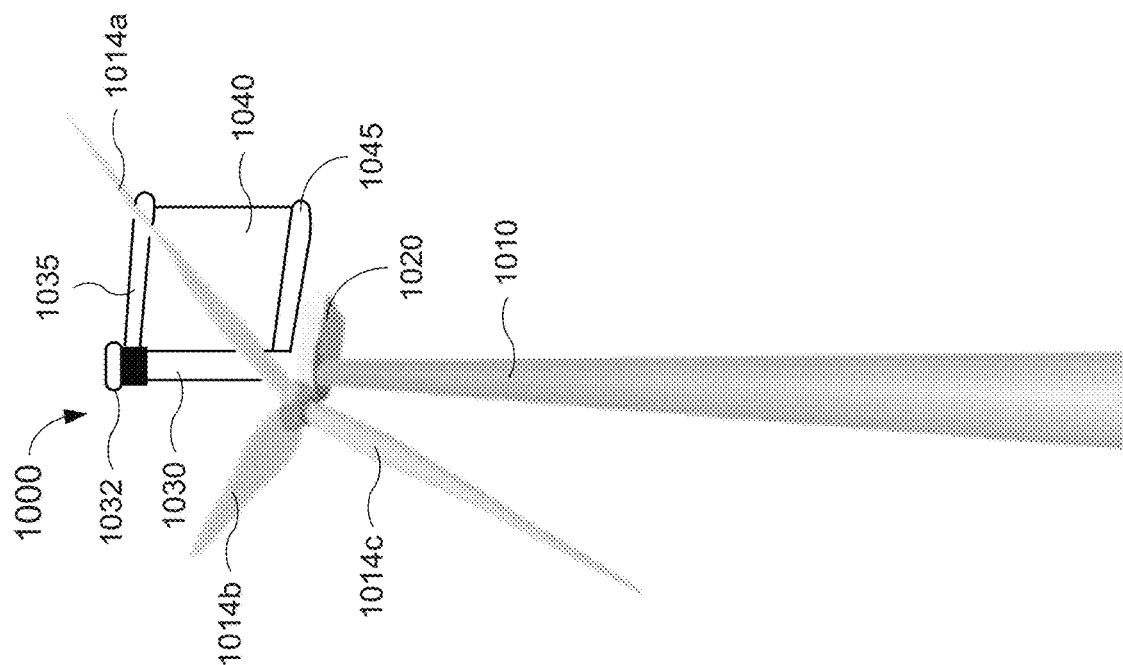
FIG. 28 is a diagram showing a general design of a fully deployed advertisement 1040 above the nacelle 1020.

The structure 1000 can be installed above the nacelle 1020. If the tower 1010 can support the extra lever forces, then the tower 1010 can be extended above the nacelle 1020 for the length of the advertisement 1040 (see FIGS. 28-29). FIG. 28 shows a wind turbine 1000 with a vertical extension 1030 having a stop 1032, movable or fixed supports 1035 and 1045, and a housing. The vertical extension 1030 may be fixed to the tower 1010 and may store the ad 1040 (e.g., in the housing). An alternative turbine 1000' is shown in FIG. 29, having hydraulic cylinders 1060a-b that raise and lower the ad 1040. The ad housing 1050 may be affixed or secured to the tower 101 and/or the underside of the nacelle 1020, and the hydraulic cylinders 1060a-b may also extend below the nacelle 1020. If the tower 1010 is extended, then the structure(s), deployment functions and safety measures disclosed herein are flipped 180° about or around the horizontal axis of the nacelle 1020, and the function(s) remain substantially the same. A top bar 1035 may be fixed or mobile, and may be substantially similar to the structure 125 shown in FIG. 1. A bottom bar 1045 may be fixed or mobile, and may be substantially similar to the structure 130 shown in FIG. 1. As shown in FIG. 29, a support bar 1050 may be attached to pistons 1060a-b that raise and lower the advertisement 1040. The pistons 1060a-b may be perpendicular to the support bar 1050.

Mechanisms for Raising the Advertisement (e.g., 120, 220, 445, 545, 625, 950, 1040 or 1260) from the Ground to a Safe Position Up the Tower (e.g., 112, 250, 320, 460, 550, 650, 710, 815, 910, 1010, 1110 or 1210)

Figure 30:
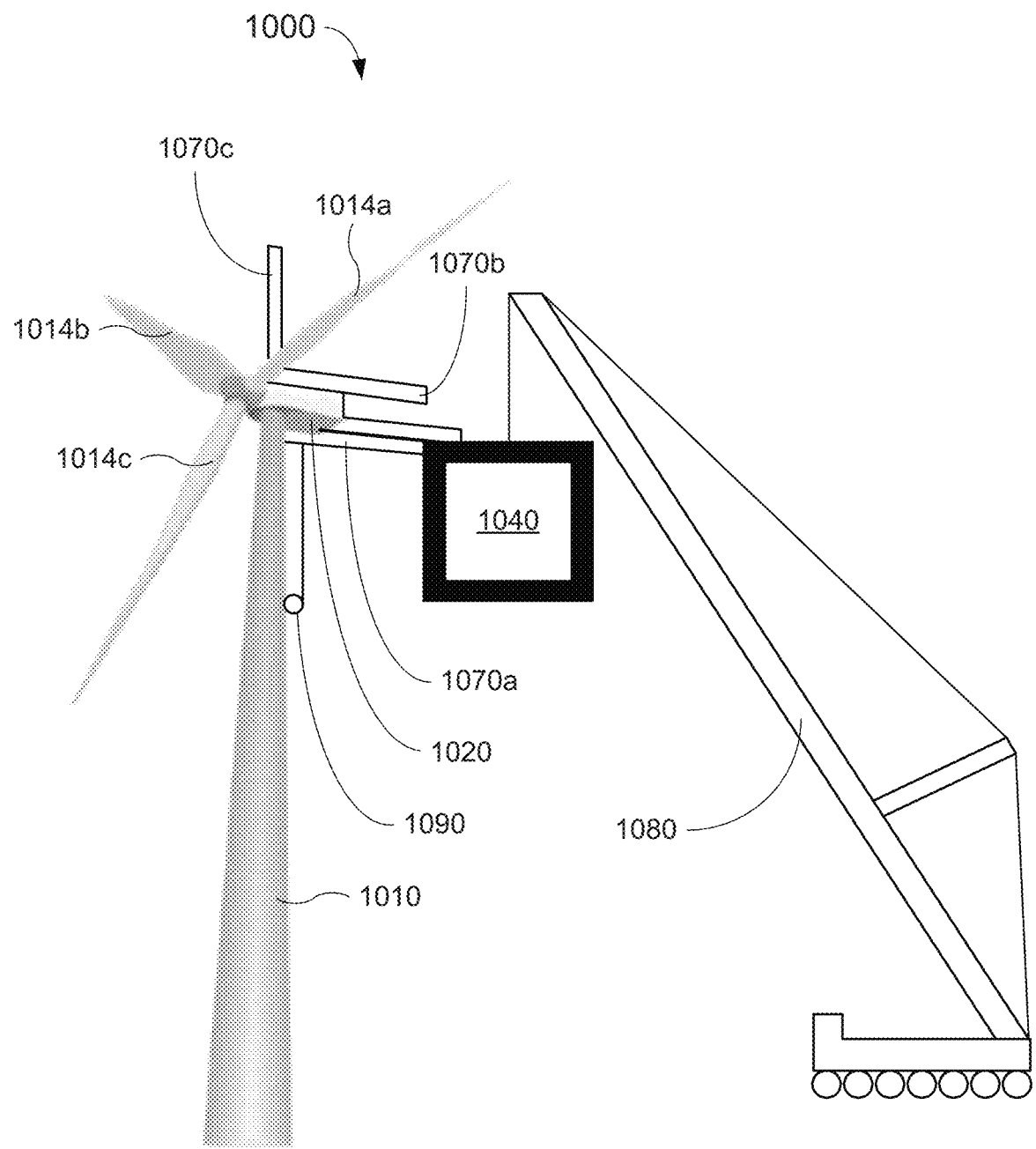
FIG. 30 is a diagram that shows how a small advertisement that has no unfurl capability can be installed using a crane 1080. Cranes can be used with rolled ads and/or blinds (fixed-panel ads) as well as fixed-position banners.

The advertisement 1040 below the nacelle (see FIG. 30) can be loaded by an exterior crane 1080 or an internal mechanism. Although FIG. 30 shows the lower advertisement structure being loaded, this same procedure can be used to install advertisements above the nacelle 1020. In FIG. 30, support structures 1070a-c are permanently installed, the advertisement 1040 includes a rigid frame, and a lock and guide 1090. The advertisement 1040 can also be lifted above the nacelle 1020 by a crane that is capable of doing so, to facilitate securing the advertisement 1040 to the support structure. Once installed in the support structure, motors and/or hydraulics that are permanently attached to the nacelle or tower can deploy and bring in the advertisement 1040 as well as flex in relation to the nacelle so that all the safety functions disclosed herein work. Alternatively, if the advertisement 1040 is of a smaller size, it can be left exposed after installation and no motor or hydraulic function is needed, just locks to the support structure and/or the ability to flex.

This can be done with the herein installed equipment or with exterior heavy equipment assets. The use of installed equipment is explained below. If the motor and cable system is not installed up-tower, the advertisements can be changed using a crane (e.g., 1080, FIG. 30) that can reach above the nacelle 1020. In this case for advertisements 1040 above or below the nacelle 1020, the structure described herein is configured to secure the advertisement 1040 to the wind turbine 1000 and ensure that the advertisement 1040 does not interfere with the blades 1014a-c.

The above structure is installed once or designed into a standard wind turbine with an internal motor and cable system (e.g., a winch) that is capable of lifting heavy loads and securing heavy loads with locks for an indefinite amount of time while following the horizontal movements of the nacelle.

EXAMPLE ONE

Figure 19:
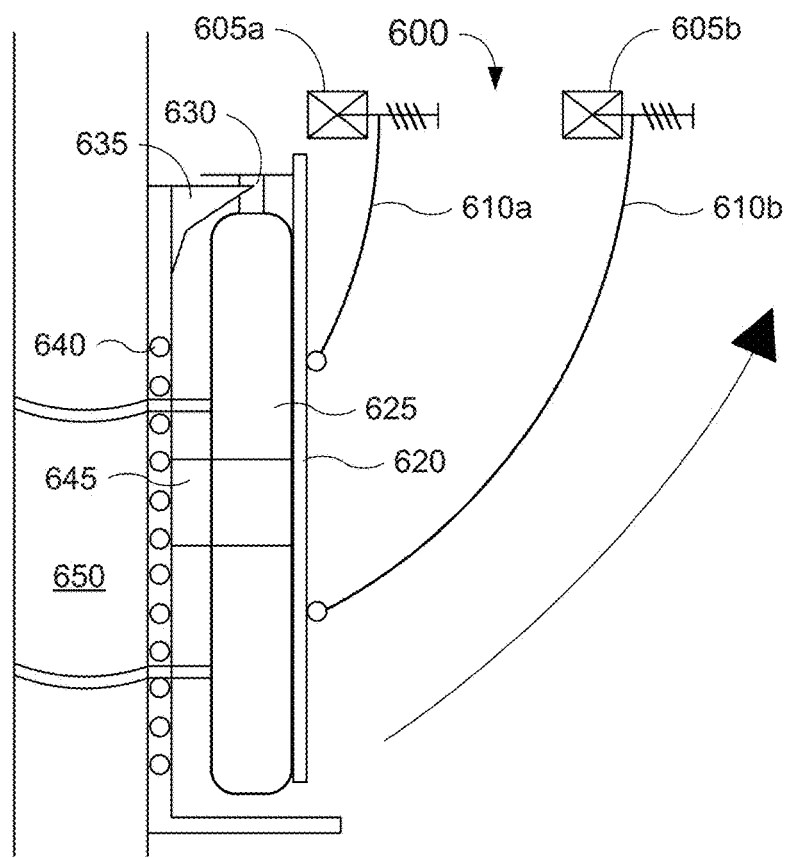
FIG. 19 is a diagram showing equipment that is used to bring the roll up and down the tower and the control functions that are needed to safely complete that task.
Figure 20:
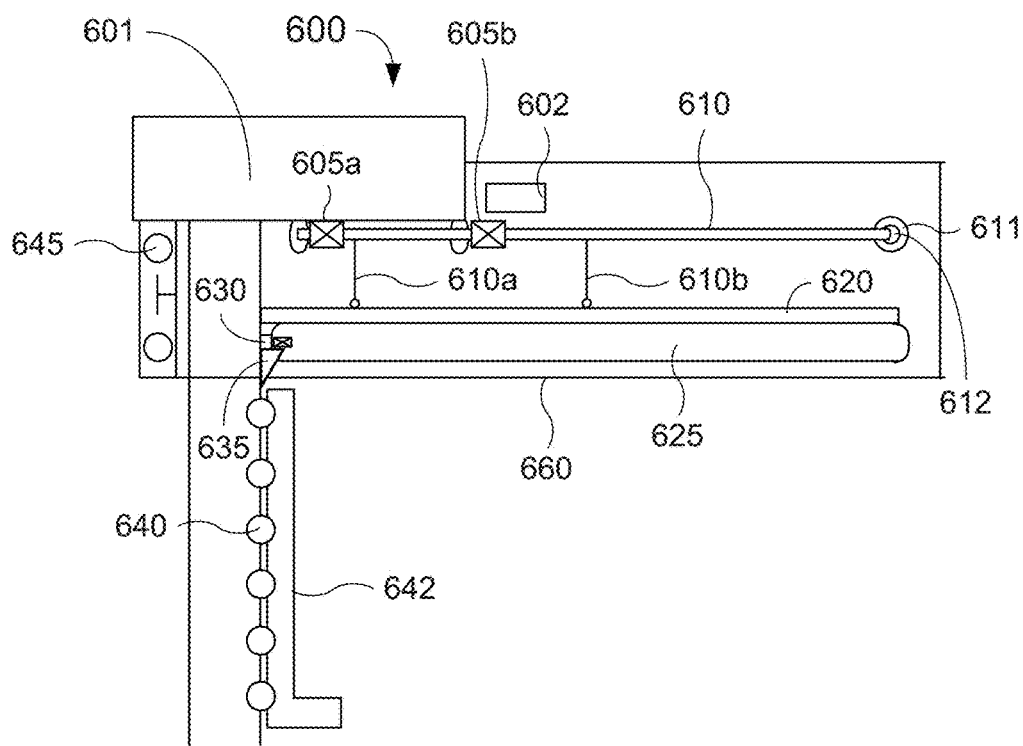
FIG. 20 is a diagram showing use of the cage/cart as a structural support during the deployment of the advertisement, following the loading process in a similar or substantially the same way as the rail/guide 143 and stopping mechanism 144 in FIG. 8.
Figure 22:
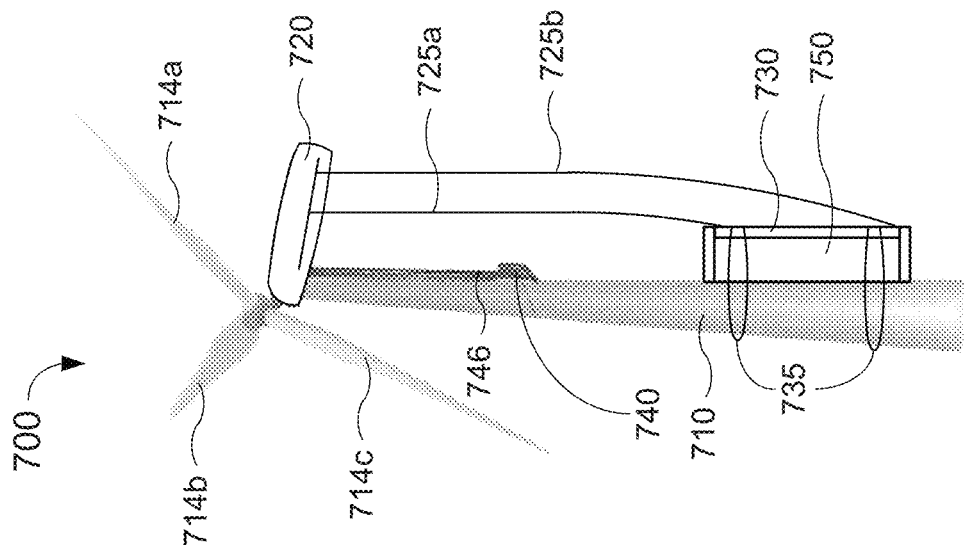
FIG. 22 is a diagram showing the loading of the ad roll/blinds with a cart or cage.
Figure 23:
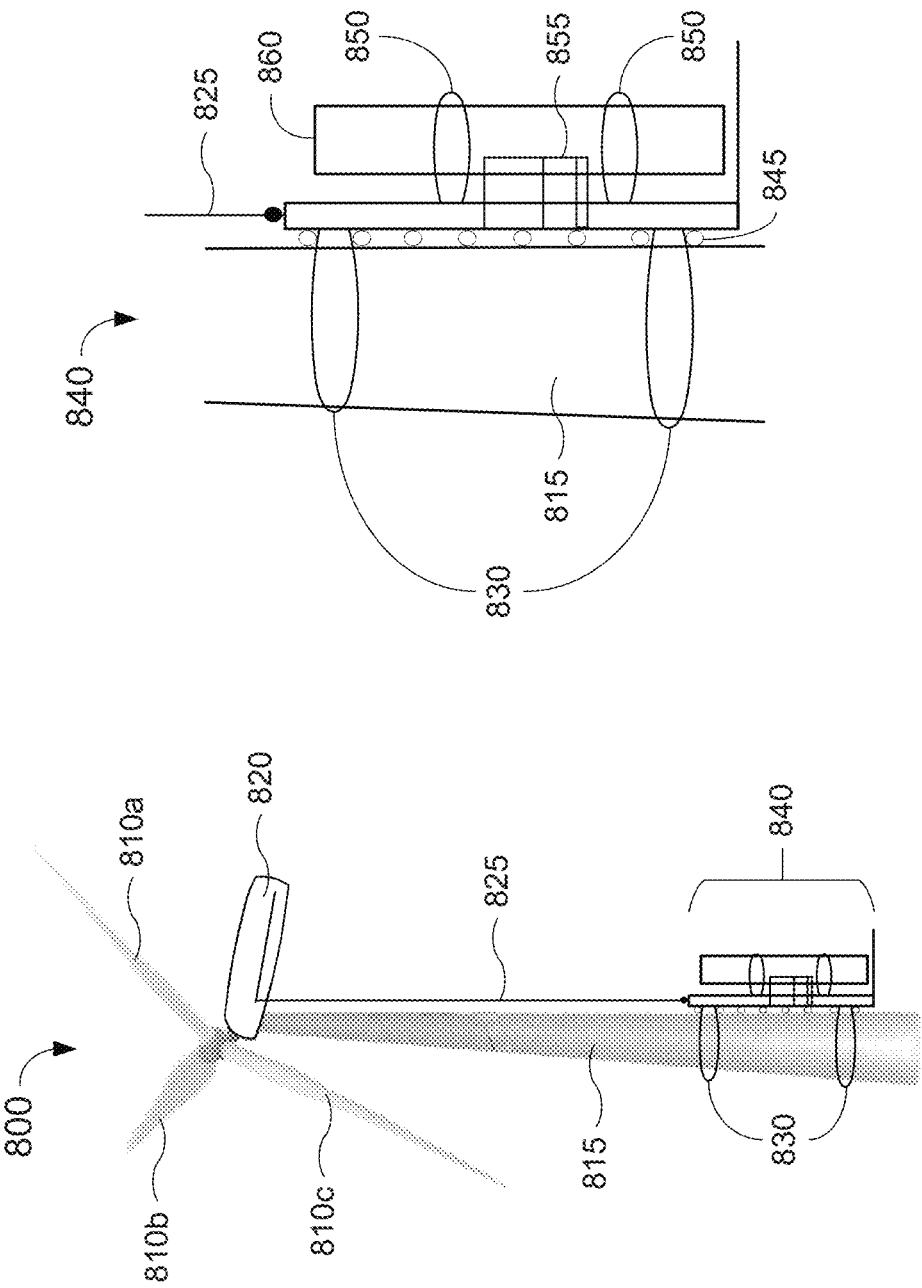
FIG. 23 is a diagram showing the loading of the ad roll/blinds with only one winch cable for a vertical housing design.

Off site, if the display 950 comprises a material that is or acts like a cloth, the ad can be printed on this material and securely attached to two booms (e.g., top and bottom booms 920 and 925). The ad 950 is then rolled around the lower boom 925 until tight (see FIGS. 27B-C). FIG. 27A shows a side view of the rolled ad 950 secured to a top bar 920 by ad ties 940a-z, with a motor 960 secured to a tower 910 as described herein. FIG. 27B is an end-on view of the rolled ad 950 of the end away from the tower 910; FIG. 27C is an end-on view of the rolled ad 950 of the end nearest to the tower 910. The motor 960 rolls a bar 925 at the lowest edge of the ad 950 as the motor 960 climbs the tower 910 (e.g., along a track or rail on the tower) to roll the ad 950 out of bad weather conditions. Furthermore, the lower boom 630, 925 may have a cage-like design that engulfs the whole roll 625, 750, 860 with a mechanism for securing the roll 625, 750, 860 to the tower 710, 815 through a system of belts 660, 735, 830 and rollers 640, 845 that does not allow the roll 625, 750, 860 to swing off the tower 710, 815 as it is raised (see FIGS. 19, 20, 22 and 23). FIG. 19 is a side view of equipment 600 for raising an ad 625 and other components for displaying the ad 625 up a tower 650. FIG. 20 is a side view of the equipment 600 with the ad 625 in a housing 660 in which the cart 642 stays in place and the operator exits through the housing 660 to the nacelle 601 and down the tower 650. The cart 642 can rotate relative to the track (along which wheels/rollers 640 roll) and/or the housing 660. FIG. 22 is a perspective view of a wind turbine 700 with the rolled ad 750 raised to a lower lock 740 secured to the tower 710 by one or more belts 735 (which may comprise a plurality of rubber wheels) around the tower 710. FIG. 23 shows a wind turbine 800 with a control platform 840 transporting the rolled ad 842 (secured by belts 850) via a cable 825 attached to the cart having a cage 855 for the operator. All designs shown in the Figures can lift an operator with the cage, or operate remotely to keep the operator on the ground or in the nacelle 820.

Figure 8:
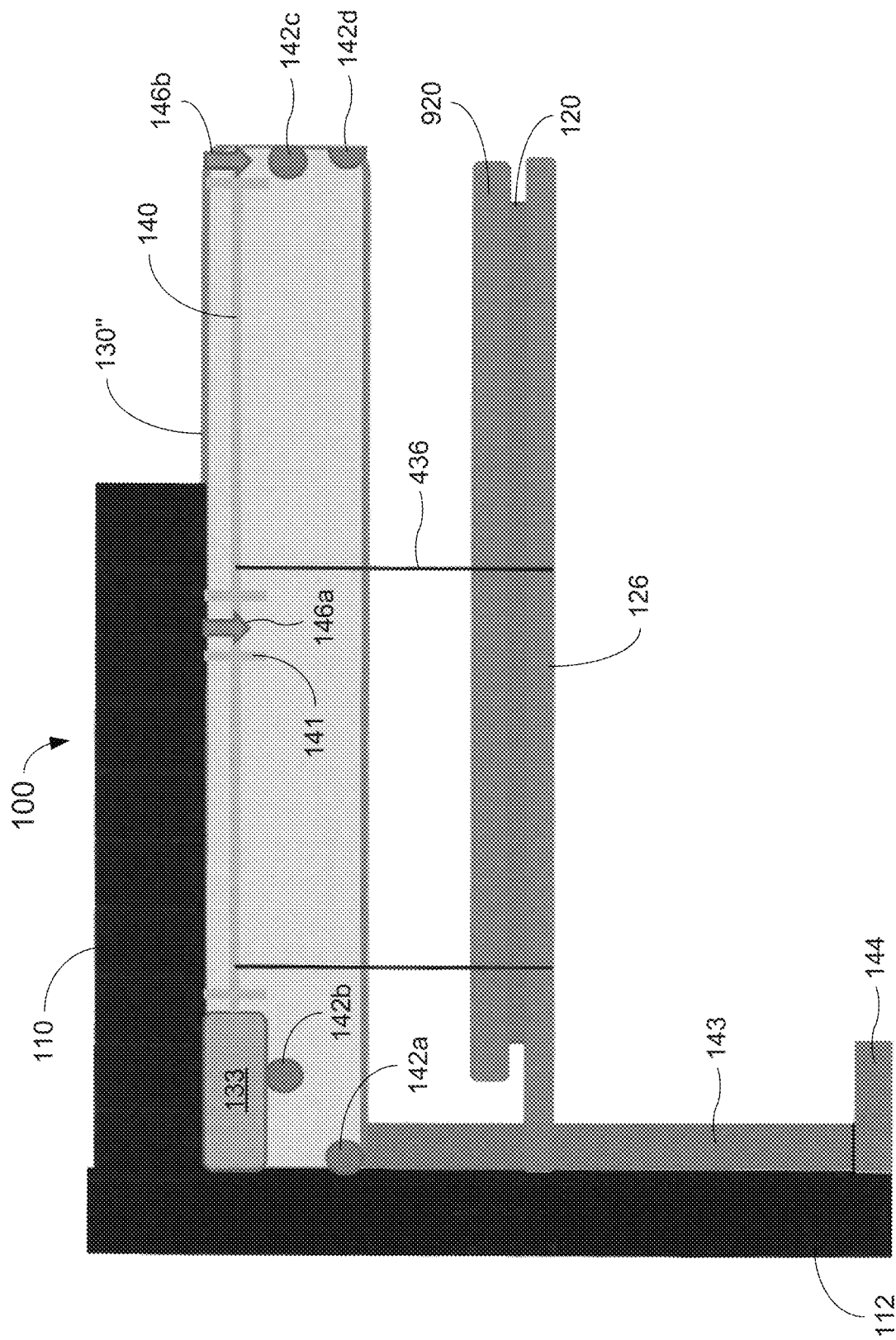
FIG. 8 is a diagram showing the ad roll being loaded or unloaded from the main housing. After loading the banner, the top boom 920 locks into locking mechanism(s) 142*b* and/or 142*c*, and the lower boom 126 can lock into locking mechanism(s) 142*a* and/or 142*d*. To display/deploy, the locking mechanism(s) 142*a* and/or 142*d* unlock and motor 133 uncoils cables 436, allowing the lower boom 126 to follow the rail or guide 143 and eventually be fixed in a stopping mechanism 144 so that the ad 120 is fully displayed and fixed.
Figure 21:
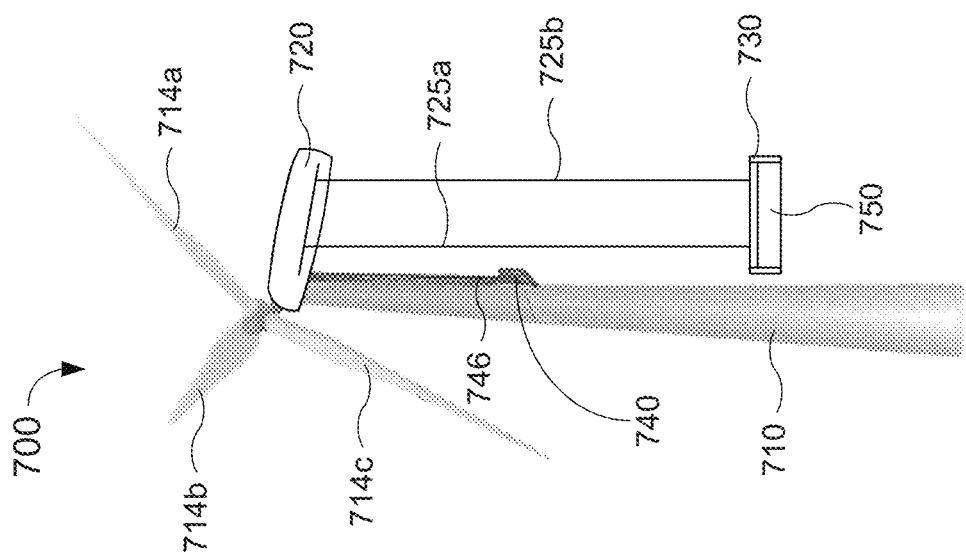
FIG. 21 is a diagram showing an exemplary system for raising the advertisement from the ground with no cart, cage or other secondary restraint devices.
Figure 24:
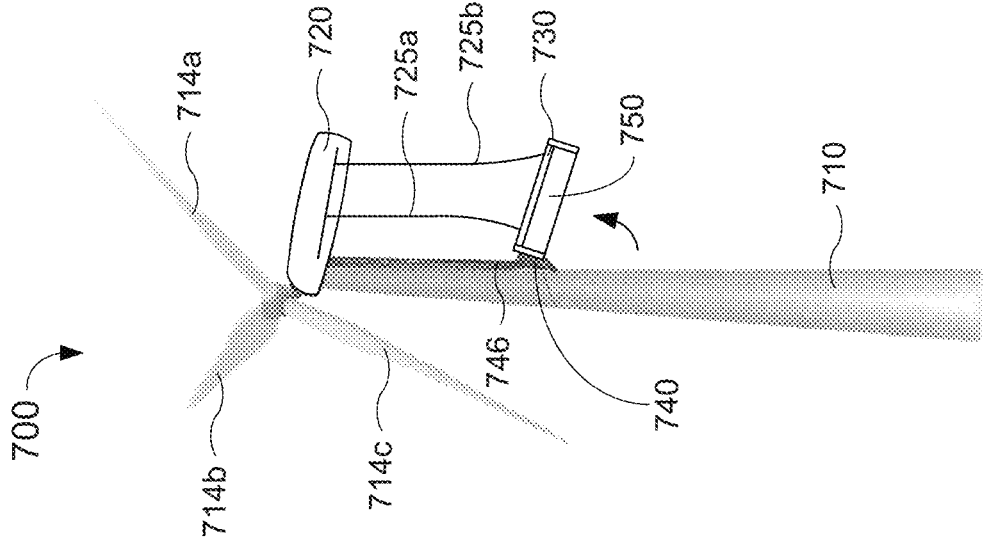
FIG. 24 is a diagram showing representation of the lower lock operations during the loading process.
Figure 25:
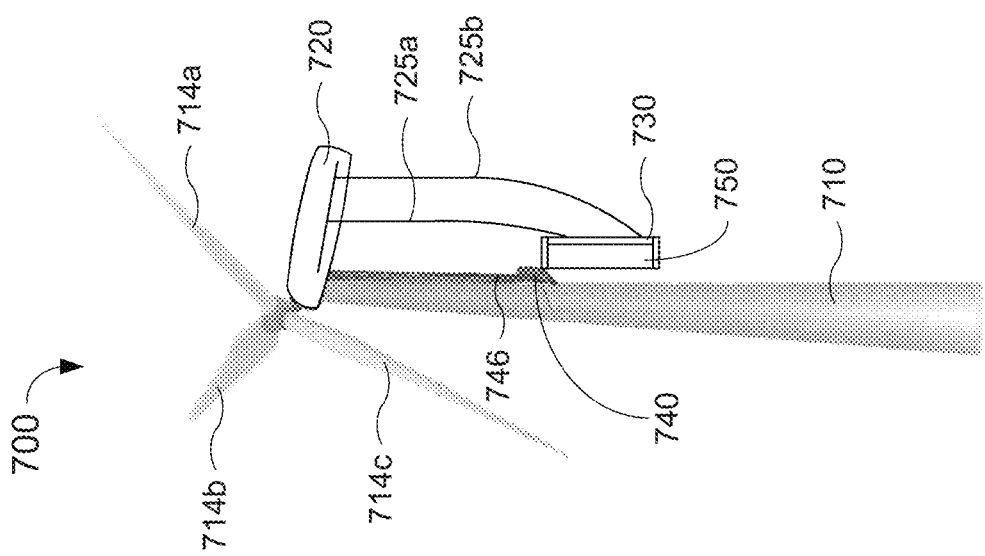
FIG. 25 is a diagram showing the advertisement 750 going from vertical to horizontal using the lower lock 740 to line up the c channel 746, which ensures that the whole advertisement moves with the nacelle.
Figure 26:
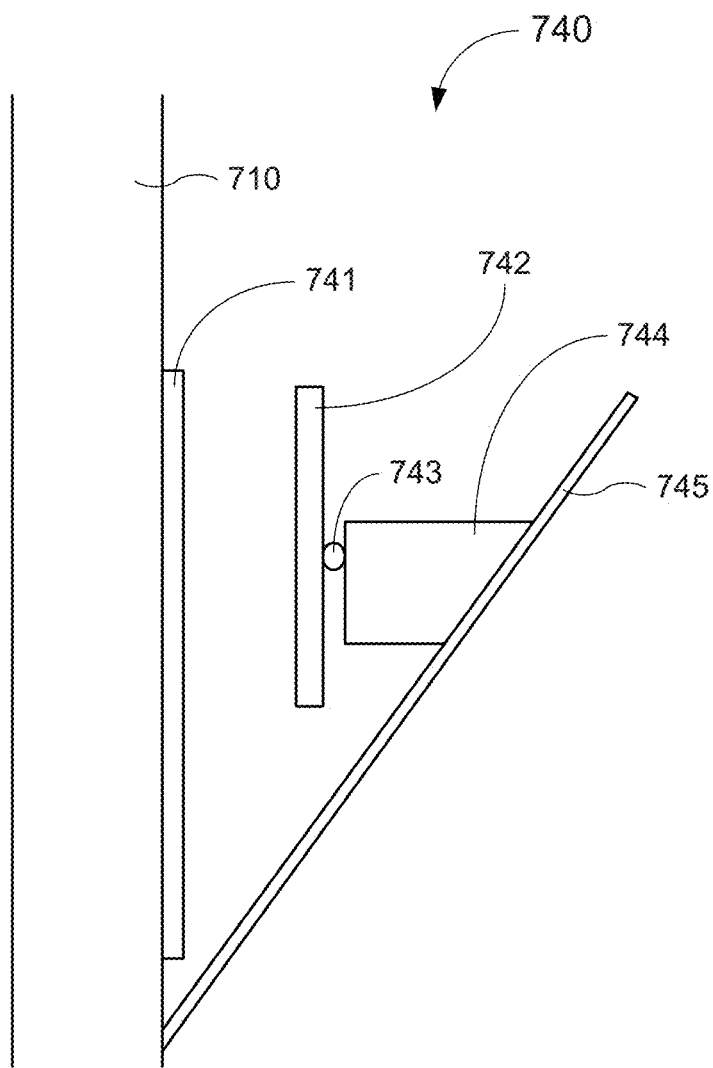
FIG. 26 is a close-up view of the lower lock 740 in FIG. 25.

The belts 660, 735, 830 and rollers 440, 640, 845 also keep the roll 625, 750, 860 from falling down the tower 402, 710, 815 if the lifting system fails. This protection is accomplished through the ability to change the diameter of the belts 660, 735, 830 as the roll 625, 750, 860 moves up and down the conical wind turbine tower 402, 710, 815. When the roll 750 is brought to the site, the winch (not shown, but exemplified by wires or cables 725a-b) is lowered and secured to the roll 750 or an upper rail 730 therefore (see FIGS. 21 and 22). FIG. 21 shows the wind turbine 700 of FIG. 22 with the rolled ad 750 secured to cables 725a-b that are lowered (e.g., to the ground). Once secured to the roll 750, 860, the winch raises the roll 750, 860 enough that the belts 735, 830 can be secured around the tower (see FIGS. 22 and 23). At this time, the roll 750, 860 is in a vertical position. The winch raises the roll 750 to the structure 746 on the underside of the nacelle 720 where the first lock 740 engages the top of the roll 750 (see FIGS. 24, 25 and 26). FIGS. 24 and 25 show the ad 750 reaching the lower lock 740 and dropping into the lower lock 740. The belts 735 (FIG. 22) are removed and lowered from the tower 710 by the operator (e.g., using a winch and cable). FIG. 25 shows the lower lock 740 engaging and the cables 725a-b retracting. The ad 750 reaches a horizontal position, then the lower lock 740 releases and the rolled ad 750 is raised to the housing 720. In the housing 720, the upper bar 730 is locked, allowing a motor in the center/lower bar 960 (FIG. 27) to deploy and undeploy/retract the ad 750. FIG. 26 shows the lock 740 in more detail, including bearings 741 configured to allow the lock 740 to rotate around the tower 710, an exterior housing or ramp 745, a solenoid 744 for locking, and a break pad 742 affixed to the solenoid 744 through an extendable piston with a rotatable joint 743 at the distal end thereof. After locking, the belts 735, 830 are removed from the tower 710, and the winch pulls the roll 750 into a horizontal position for an optional second lock to hold the opposite side of the top or bottom boom in one design (see FIGS. 8 and 16). FIG. 8 shows the apparatus of FIG. 7 deploying the ad 120 using cables 436 unwound from a rotating shaft 140 driven by the motor 133 and supported in part by bearings 146a-b. FIG. 16 shows the wind turbine 400 with the ad/lower bar 455 retracted into the housing 410.

In another design, the first lock 740 is at the length of the unrolled banner (e.g., a distance down the tower from the nacelle corresponding to the length of the unrolled banner). Once the roll 750 is raised to this point, it enters the support track 746 that will facilitate the ad 750 tracking the direction of the nacelle 720 (see FIGS. 25 and 26). Removal is the opposite procedure.

EXAMPLE TWO

Off site, if the display material is a rigid and/or sectional material, the ad is displayed similarly to printed material on window blinds. For example, the slats are organized (e.g. strung together) and attached to a top boom and a lower boom to create the ad blinds. The lower boom has a cage-like structure that can be attached to the wind turbine's tower with the belts as in example one. On site, the winch is lowered and connected to the apparatus to raise it in the same way as the roll. Removal is the opposite procedure.

Figure 18:
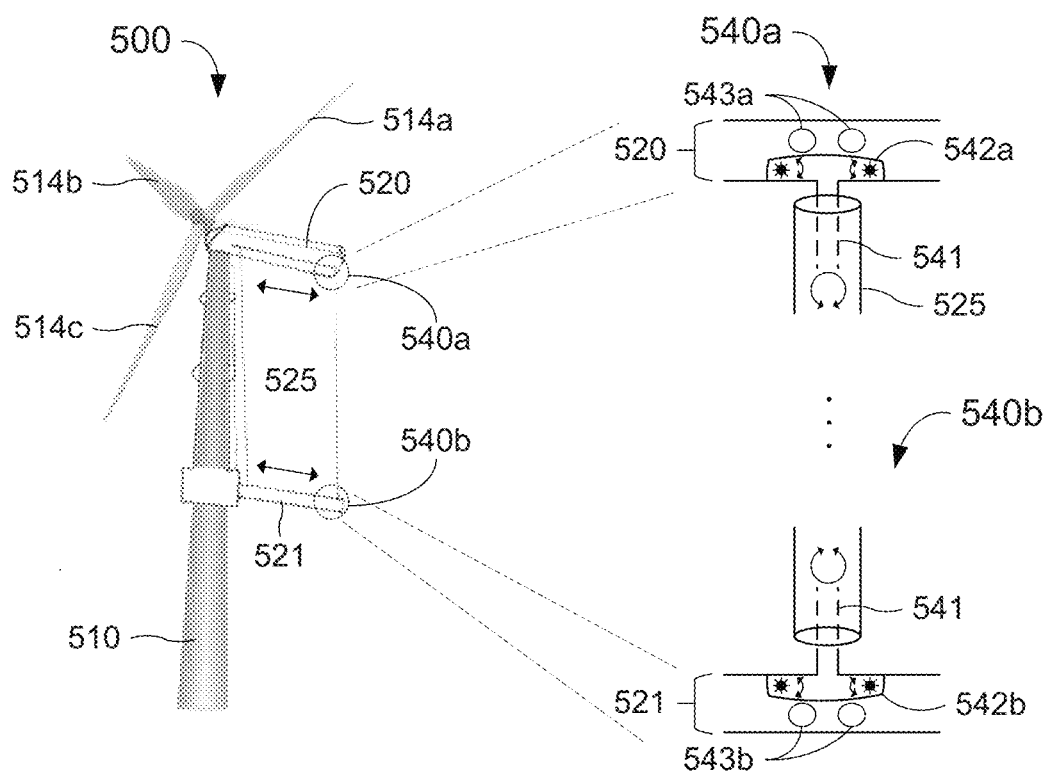
FIG. 18 is a diagram showing a system for deploying and/or undeploying the ad horizontally.

EXAMPLE THREE a support structure that allows an advertisement to be displayed on a horizontal wind turbine: Off site, the advertisement 525 has the booms 520, 521 installed on both sides with a roller 540a on the boom 520 and a roller 540b on the boom 521 (see FIG. 18). The rollers 540a-b may be equipped with motors 542a-b that rotate an outside boom 541 to furl and unfurl the advertisement 525. The motors 542a-b may rotate the outside boom 541 and move the outside boom 541 towards the tower 510 and away from the tower 510. In alternative embodiments, one of the motors 542a-b rotates the outside boom 541, and the other of the motors 542a-b moves the outside boom 541 towards the tower 510 and away from the tower 510. The function of rolling the ad 525 and moving the skid can be done with a single motor (e.g., when the ad 525 is made of sufficiently strong and/or stiff material[s]). The outside boom 541 that is furthest from the tower 510 has the same cage apparatus and belts as Examples 1 and 2. At the site, this style of advertisement 525 (e.g., a roll or blinds) is attached to the lower guide for the boom 521 (or to the lower boom 521 itself) so that the advertisement 525 is the vertical part of an L, and the boom 521 is the horizontal leg of the L. The winch system lifts the L to the top of the tower 510 using the same belt guides as above. Once the top of the L locks into the up-tower equipment, the winch is removed or can assist in safety operations. Upon locking, the outside boom 541 engages a motor and pulley system so that the outside edge is able to move in the top and bottom guides away from and towards the tower 510 when needed. This is a similar action as in U.S. Pat. No. 4,546,718 (the relevant portions of which are incorporated herein by reference) once installed up tower. Removal is the opposite procedure.

Another mechanism for raising any of the apparatuses is to install a rack gear through and/or along the vertical length of the tower 510. The belt system has drive gears attached to motors in the top and bottom belts. After the belts are attached to the tower, the caged advertisement drives itself to the top using the drive gears in the rack gear while the belts hold the two gears together.

Tower safety systems monitor the clamping/latching mechanisms in all Examples and can override and recover to a safe position of the banner if necessary. Alternatively, the tower inserts the banner system control electrical connection to the banner carrier after the tower recognizes that all the latches are made.

The position of the cage may be controlled and/or kept close to the tower 510 at all times. The ad (e.g., roll/blinds) may be raised and lowered in a compact bundle. A spring or motor or operator-controlled set of rollers may be used to control the distance the roll is from the tower, even as the tower diameter changes.

Elevator-style counterweights inside the tower to enable the whole banner and carrier to be easily lifted and lowered with low power.

Ways to Minimize Drag in Adverse Conditions on the Advertisement (e.g., 120, 220, 445, 545, 625, 950, 1040 or 1260)

Drag minimization must be able to be done during normal operations and after an electrical or mechanical failure, as well as after catastrophic failure of all mechanical and electrical components in adverse weather without further damage to the wind turbine. There are safety devices that can operate while the advertisement/banner is deployed, for example in the case where the wind velocity increases or the wind direct changes suddenly. Non-limiting examples of how drag minimization is achieved follow.

Figure 10:
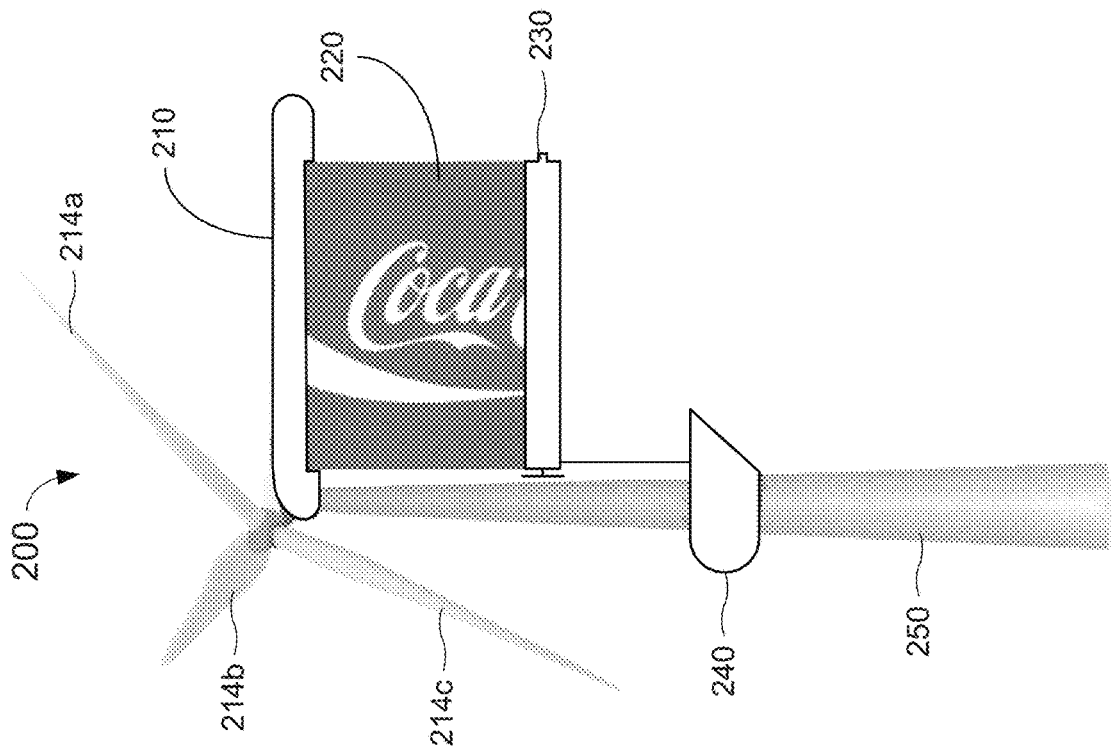
FIG. 10 is a diagram showing the advertisement being deployed or undeployed.
Figure 9:
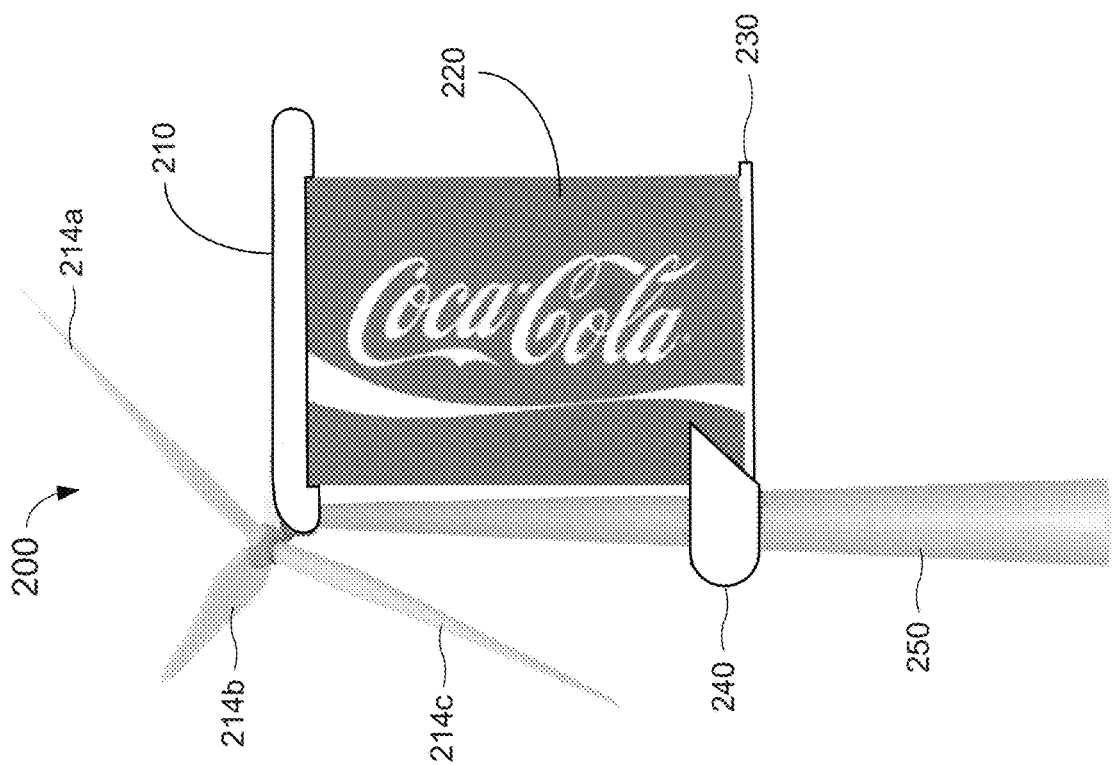
FIG. 9 is a visual representation of the potential of the present system.
Figure 17:
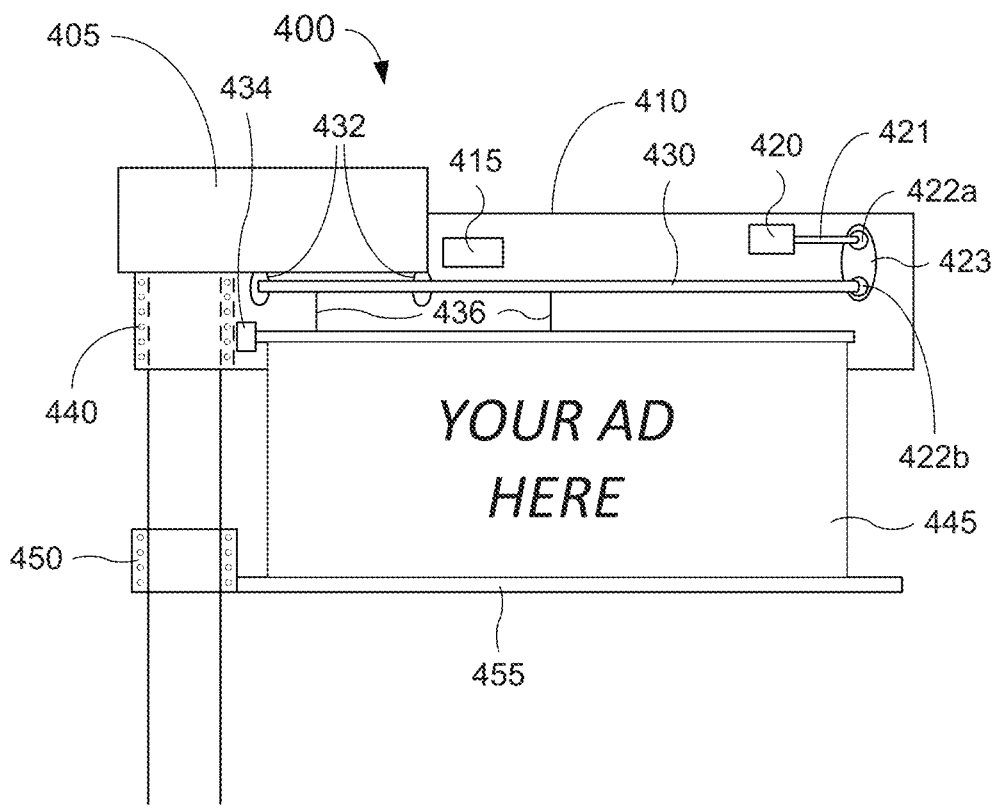
FIG. 17 is a diagram showing the system for deploying (bringing out) or undeploying (bringing in) the advertisement vertically.

The banner or blinds 120, 220, 470, 625 may be stowed in a safe, unexposed position through the rolling, bundling, and/or folding of the banner or blinds 120, 220, 470, 625 vertically in the apparatus (Examples 1 and 2, FIGS. 2, 6, 7, 8-12, 14-17, and 27) or horizontally (Example 3; see FIGS. 5, 13, 18, 31, and 32). FIG. 10 shows the ad 220 (FIG. 9) partially deployed. A motor (not shown) in the center bar 230 is uncoiling the bar 230. The top bar (not shown) is locked in the housing 210. This is done with human interaction (on site or off site) or autonomously. The data to make the decision to deploy or undeploy (e.g., automatically or otherwise) can be from any or all applicable sources, including data sources internal to the apparatus or in/from an external source (e.g., one or more sensors [for temperature, wind speed and/or direction, humidity, etc.] on or in the turbine, external weather data [e.g., weather forecast information], etc.). Some ways of deploying and undeploying include, but are not limited to:

Rolling/bundling/folding the banner up vertically can reduce or minimize drag. For Examples 1 and 2, once the ad (e.g., roll/blinds) 120, 220, 470, 625 have the belts removed and the second lock engaged, the winch system deploys the ad 120, 220, 470, 625. To do this, as the winch provides slack, the caged lower boom 125 follows a C track 102 secured to and extending down the tower 112 from the permanent structure 130 under the nacelle 110 (see FIG. 1). This track 102 follows the nacelle's movements. This track 102 may have aerodynamic properties that minimize the turbulence that the blades 114a-b and the round tower 112 put on the advertisement 120 behind them, limiting the horizontal loads that the advertisement 120 will have on the tower structure. Once the advertisement 120, 220 is fully deployed, the lower boom 125, 230 locks into the bottom of the C track 102 to give the advertisement 120, 220 rigidity on the lower end (also see FIG. 9; COCA-COLA is a registered trademark of the Coca-Cola Company, Atlanta, Ga.). FIG. 9 is a side view of the wind turbine 200 shown in FIG. 10 with the ad 220 fully deployed and engaged in the lower lock 240. If adverse weather is forecasted, the lower lock (e.g., 240) is disengaged, and either the upper boom (e.g., 430) rolls the advertisement 120, 220, 445 (Example 1) (see FIGS. 6, 10, and 17), or the winch system lifts the advertisement (e.g., the blinds; Example 2). FIG. 17 shows the equipment 400 also shown in FIGS. 14-16 with the ad 445 partially deployed. Alternatively, a motor 960 can be put in the lower boom 925 and mounted to the mechanism that rides in a C track (see, e.g., FIG. 18). In this design, rolling the bottom boom 925 has the effect of rolling the advertisement 950 into the nacelle to be stored like the other designs.

Rolling/bundling/folding the banner up horizontally can also reduce or minimize drag. For Example 3, pulleys and a cable and/or motor system may pull the outside boom of the banner 120, 525 away from the tower 112, 510 to deploy the advertisement (see FIGS. 5 and 18). To undeploy and store the banner 120, 525, roll the inside boom 145 with a motor moving the advertisement 120, 525 out of adverse conditions by pulling the outside boom 541 to the tower 112, 510. This can also be done by having two motors 542a-b on the outside boom 541, allowing the outside boom 541 to roll up the advertisement 525 while moving horizontally on the guides 543a-b. If the advertisement 525 is in the form of blinds, the pulleys and cable and/or motor system deploy the ad 525 and recover it before adverse weather conditions. This is done by having motors (e.g., 542a-b) in the outside boom 541 to drive the outside boom 541 away from the tower 510 to expose the banner 525 and then to drive the outside boom 541 back to the tower 510 to get the advertisement 525 out of the weather. The advertisement 525 can also be brought out of the weather by having the winch cable from the housing around a pulley in the middle of the banner 525. The cable draws in the outside boom 541 to the tower 510 before adverse weather hits.

Hydraulic or electric cylinders 1060a-b that extend from the housing 1050 at the nacelle 1020 and tower support structure can extend the advertisement 1040 out (e.g., either above or below the nacelle 1020) and bring it back in heavy wind (see FIG. 29).

If the stowage system fails, there are alternate ways of minimizing drag during operation or if the retraction system should fail. For example, back-up systems that minimize the drag of the advertisement on the tower can be employed. These include, but are not limited to, the following examples.

Figure 3:
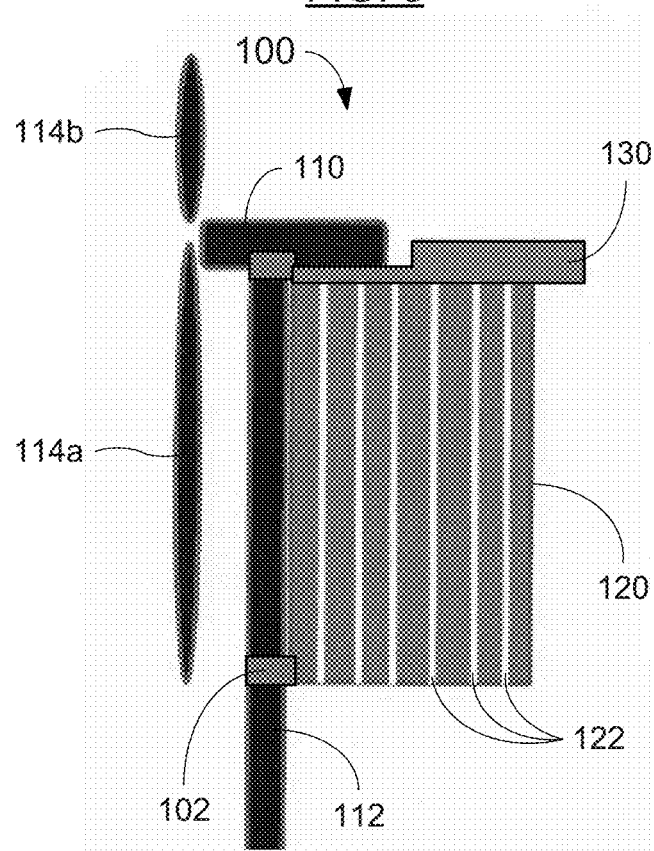
FIG. 3 is a diagram showing vertical break away stitching or independently turning panels that allow the wind to pass through the advertisement in extreme conditions.

The banner 120 breaking vertical or horizontal stitches 122 to allow air to pass through if a certain amount of force is put on it in a cross wind (see FIG. 3). FIG. 3 shows a side view of a wind turbine 100 deploying an ad 120 relatively safely, even if retractions fails during high, multi-directional wind conditions. Even if the stitching 122 opens, the advertisement 120 can still be rolled up or retracted in the case of the banner comprising a plurality of blinds (e.g., when that function is restored).

A mechanism to rotate individual sections of the blinds using electrical motors or resistance-based mechanical mechanisms to limit wind shear. This will be found on the apparatus that operates the blind-style advertisements.

A mechanism for removing the banner from the tower and ensuring that it lands in a safe place. This can be done by disconnecting the latches that hold the structure to the tower and relying on friction and/or brakes built into the guide structure to control the rate of descent. This can be done manually or autonomously. The rate of descent can be fast compared to the stow rate up the turbine.

During any point of the raising process, if something fails, the banner and other components do not interfere with the operation of the wind turbine until such time that heavy equipment or troubleshooting can fix the situation. Fail-safe belt systems ensure that even without power or control, the cage that holds the ad does not fall. A feedback system lets the service personnel and turbine know that the lock is made or not. Each lock is sensed individually so that up-tower service can correct a failed lock right away.

Figure 4:
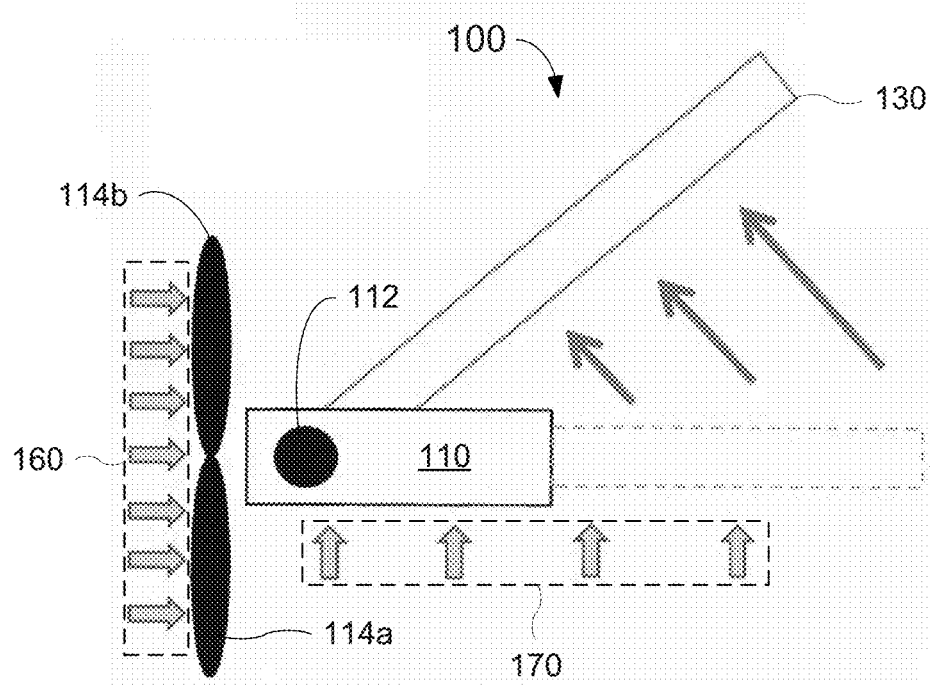
FIG. 4 is a bird's eye view of an example of the possible loads on the tower and the advertisement housing 130 flexing away from the center line of the nacelle during a cross-wind event to mitigate drag.

The advertisement can be attached to a hydraulic, spring or weight restraint that allows the advertisement to have as much as 90 degrees of variation to the nacelle while still tracking the general position of the nacelle. In a mild cross wind, the advertisement deflects from being in line with the nacelle and perpendicular to the blades. This minimizes the surface area exposed to the cross wind and allows the wind to deflect from the advertisement. The deflection cannot exceed 90 degrees as this has the potential of allowing the blades to strike the advertisement (FIG. 4).

The Advertisement (e.g., 120, 220, 445, 545, 625, 950, 1040 or 1260) can be Any Medium for Advertising or Communicating a Message For example, the medium may be or comprise a plastic or sail material-like fabric in any shape. Battens can be used to limit some of the flapping motion of the banner and allow the banner to be rolled or gathered up into a compact bundle.

The medium may also be or comprise solid panes of a composite metal, plastic or fiber board or glass (e.g., to be able to include present and future developments in TV technology).

The medium may be or comprise an electronic ink in the display, like in e-readers, where power is used only when the copy is changed. This eliminates the need to physically change the ad.

The medium may also be or comprise semi-transparent overlays on top of banner material that contain LEDs capable of being the ad material at night. Lighting is timed with local preferences for when the sign goes dark for the night.

Figure 31A:
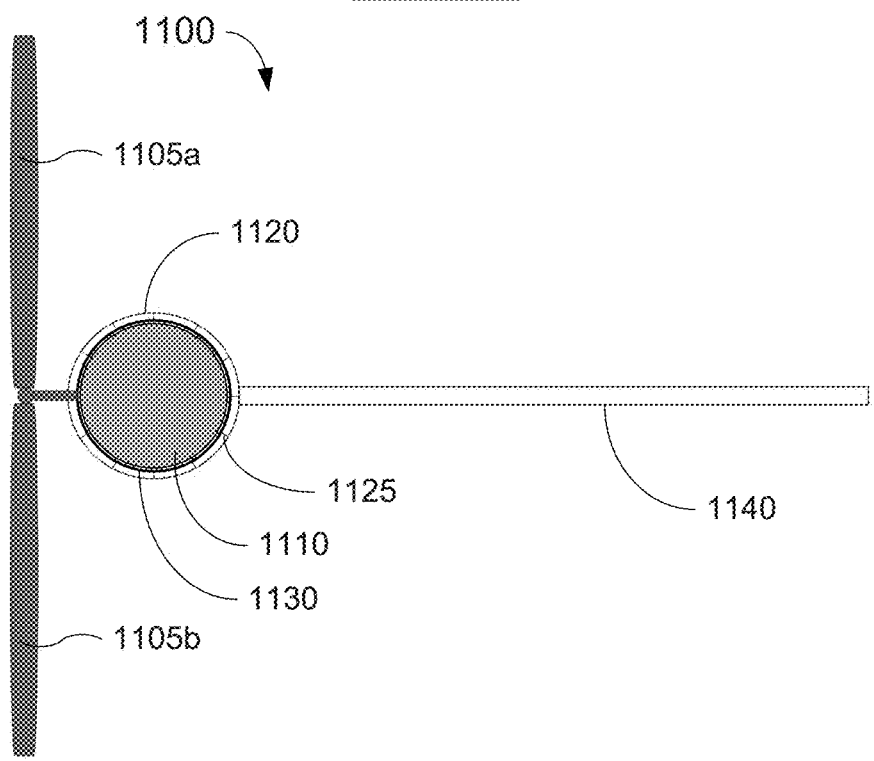
FIGS. 31A-D are diagrams showing top views of cross-sections of a horizontal wind turbine equipped with a kit for deploying and undeploying an advertisement along one or more horizontal rails using a boom motor, a retraction motor and solenoids.
Figure 31B:
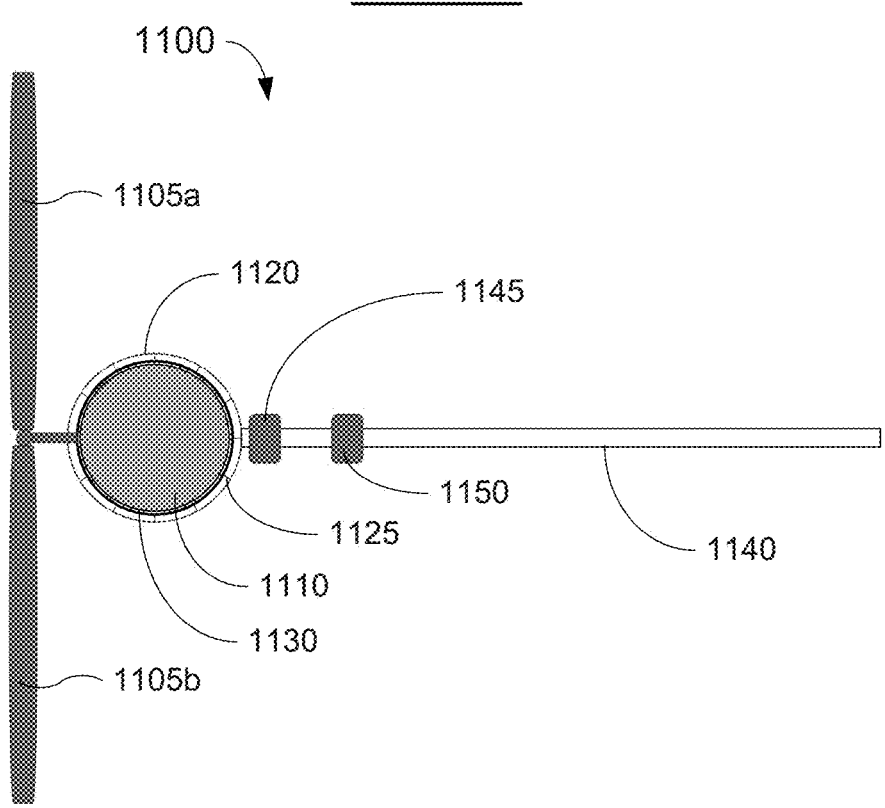
Figure 31C:
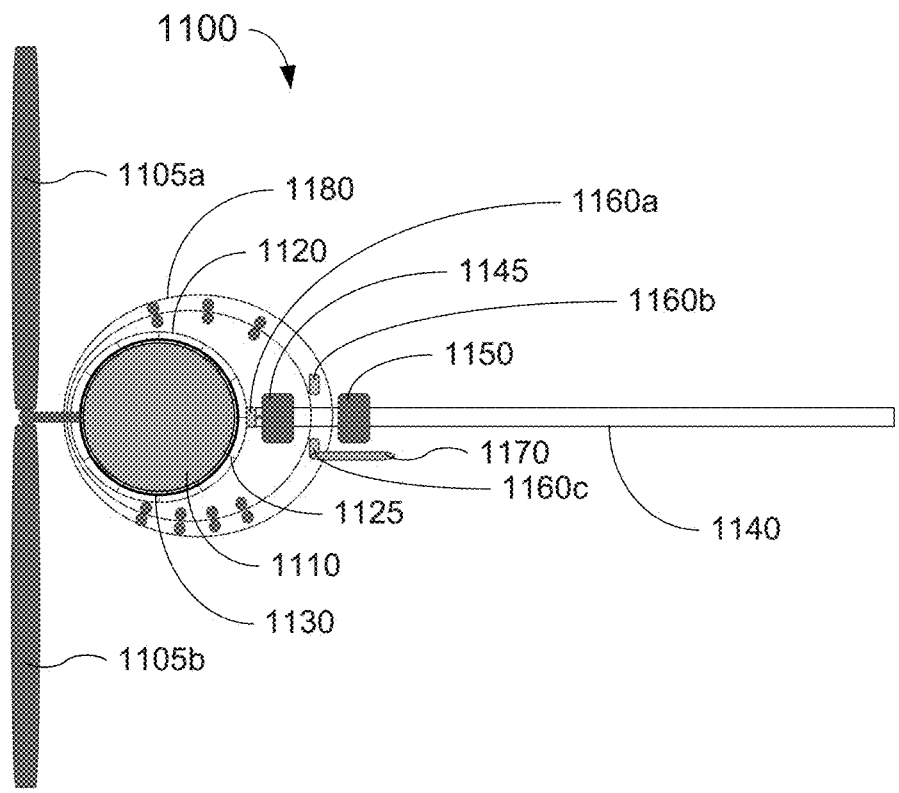
Figure 31D:
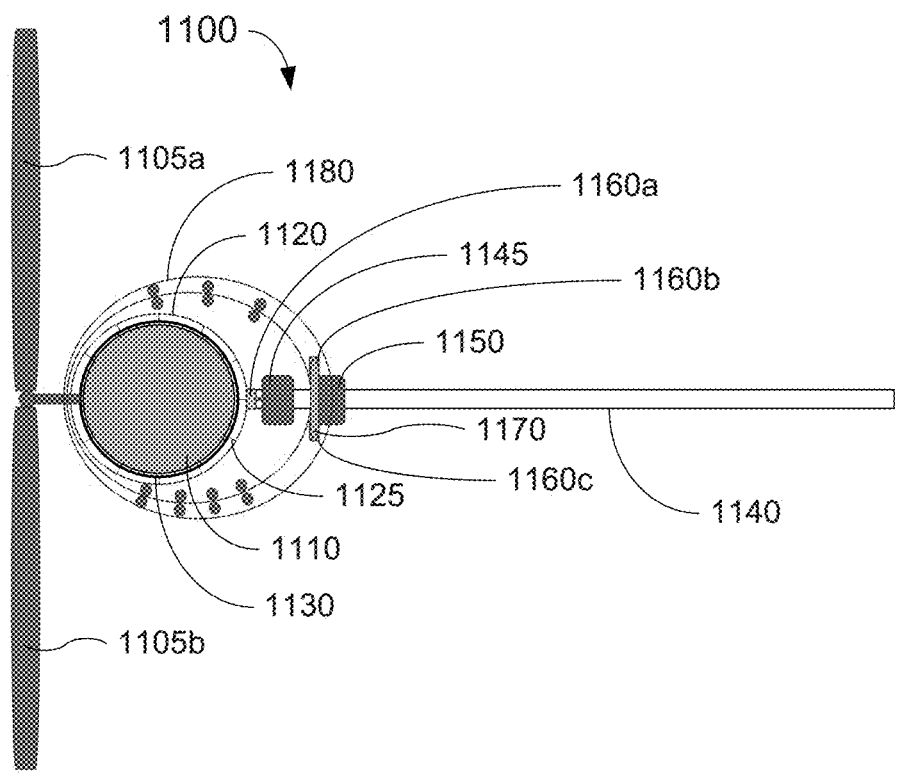

FIGS. 31A-D are diagrams showing top-down cross-sections of a system for deploying and undeploying an advertisement attached to a wind turbine 1100 horizontally. The wind turbine 1100 has the ability to store many advertisements up tower in a vertical housing 1180. Inside and outside booms 1145 and 1150, respectively, are on opposite ends or edges of an ad (not shown). FIGS. 31C and 31D show 7 ad rolls in storage. FIG. 31A shows turbine blades 1105a-b, a tower 1110, a deflection apparatus (see, e.g., the above description), a bidirectional or restorative force application mechanism (e.g., a leaf spring) 1125, a bearing 1130, and a top bar 1140. FIG. 31B shows the components of FIG. 31A, plus a retraction motor 1145 and a bar motor 1150 (e.g., which extend and retract the ad along the upper bar or track and similarly at the lower bar/boom). The bidirectional or restorative force application mechanism 1125 may also include a hydraulic spring, cylinder or shock absorber, a mechanical spring or shock absorber, etc. FIG. 31C shows the components of FIGS. 31A-B, plus a plurality of solenoids 1160a-c, a locking guide 1170 for sending the ad roll into storage 1180 in a housing to store and protect the equipment. FIG. 31D shows the components of FIGS. 31A-C and the advertisement (not shown) being stowed in the vertical housing 1180.

FIG. 32 is a diagram showing a side view of FIG. 31, of a system for deploying and undeploying an advertisement 1260 horizontally attached to a turbine 1200 including gears 1215, ad yaw system gears 1220, ad yaw motors 1225, a restorative force application mechanism or shock absorption system as described herein, a boom/bar 1240, banner holders 1245, and recoiling motors 1250.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

The invention claimed is:

1. A kit for securing an advertisement and/or advertising space to a horizontal wind turbine at a blade height of the horizontal wind turbine, the horizontal wind turbine having blades on a blade side of the turbine, a non-blade side opposite the blade side of the turbine, a tower, and a nacelle capable of turning during normal function, the kit comprising:

the advertisement and/or advertising space, on the non-blade side of the horizontal wind turbine;

a base configured to join, connect or affix the advertisement and/or the advertising space to the tower and/or the nacelle;

at least one rail or structural extension extending from at least one of the tower and the nacelle, the at least one rail or structural extension being configured to secure a first edge of the advertisement and/or advertising space;

at least one roller or drum (i) around which the advertisement and/or advertising space is rolled, or one or more cables attached to the advertisement and/or advertising space are coiled, or (ii) on or to which the advertisement and/or advertising space is gathered or bundled, wherein the at least one roller or drum is adapted to be connected or secured directly or indirectly to one or more of the at least one rail or structural extension, the nacelle, and the tower;

at least one motor or other electric, mechanical or hydraulic mechanism configured to (i) unfurl or deploy the advertisement and/or advertising space in a first direction along the at least one rail or structural extension and (ii) roll or undeploy the advertisement and/or advertising space in a second direction opposite to the first direction; and a structure other than the nacelle, the structure being (a) attached to the nacelle, the tower, or a line or vertical rail along the tower, and (b) configured to facilitate turning of the base to (i) deflect a load caused by a cross-wind on the advertisement and/or advertising space and (ii) prevent the advertisement and/or advertising space entering a space in which the blades rotate.

2. The kit of claim 1, wherein the advertisement and/or advertising space is the advertisement, and the kit is configured to store the advertisement in or on the horizontal wind turbine or in or to a housing and/or bracket attached to the horizontal wind turbine vertically or horizontally.

3. The kit of claim 1, wherein the advertisement and/or advertising space comprises a material selected from the group consisting of a plastic, a cloth, and solid panels of metal, wood, plastic, glass, or composites thereof.

4. The kit of claim 1, wherein the rail or structural extension comprises a C-rail, and the kit further comprises a wheel, guide or other mechanism attached to the first edge of the advertisement and/or advertising space, configured to secure the advertisement and/or advertising space to the C-rail and securely move in the C-rail.

5. The kit of claim 1, wherein the advertisement and/or advertising space is the advertisement, and (i) the rail or structural extension is horizontal, and the kit is configured to store the advertisement in or near the tower, or (ii) the rail or structural extension is vertical, and the kit is configured to store the advertisement in or near the nacelle.

6. The kit of claim 1, wherein the at least one motor or other electric, mechanical or hydraulic mechanism comprises the at least one motor.

7. The kit of claim 6, wherein the at least one motor is configured to fit in or near the nacelle or in a housing adjacent to the nacelle.

8. The kit of claim 7, wherein the advertisement and/or advertising space is the advertisement, the roller or drum comprises the roller, the roller is configured to fit on the nacelle of the horizontal wind turbine or in the housing, the advertisement is rolled and unrolled around the roller, and the motor drives the roller.

9. The kit of claim 7, wherein the roller or drum comprises the drum, the one or more cables are coiled and uncoiled around the drum, and the at least one motor drives the drum.

10. The kit of claim 1, wherein the structure is attached to the tower and comprises one or more sets of bearings configured to allow the base to rotate around the tower or around a line or vertical rail along the tower.

11. The kit of claim 1, wherein the structure comprises a plurality of brackets attached to one or more structures of or in the horizontal wind turbine, configured to secure the advertisement and/or advertising space to the horizontal wind turbine.

12. The kit of claim 11, wherein each of the plurality of brackets is attached to the tower or one or more structures on or in the tower.

13. A horizontal wind turbine, comprising:
the kit of claim 1, installed in and/or on the horizontal wind turbine;
the blades, configured to rotate on or around a shaft upon application of a wind force;
a housing that tracks the movement of the nacelle, configured to house the shaft; and
the tower, configured to support the plurality of blades and the nacelle.

14. The horizontal wind turbine of claim 13, further comprising a vertical guide or vertical rail along the tower, configured to secure the advertisement and/or advertising space to the tower as the advertisement and/or advertising space is raised or lowered along the tower.

15. The horizontal wind turbine of claim 13, further comprising a locking mechanism configured to secure one or more of the at least one rail or structural extension in and/or to the tower and/or a structure along the tower, and prevent the one or more of the at least one rail or structural extension from falling below a set height along the tower.

16. A kit for raising and optionally lowering an advertisement and/or advertising space on a horizontal wind turbine, comprising:
the kit of claim 1;
a plurality of raising cables having a length sufficient to be attached to both (i) the advertisement when the advertisement and/or advertising space is on the ground and to (ii) a shaft, one or more pulleys, or a roller or drum in or on a nacelle of the horizontal wind turbine;
one or more mechanisms configured to secure at least one of the advertisement and/or advertising space, the at least one rail or structural extension, and the at least one roller or drum to a tower of the horizontal wind turbine; and
a locking mechanism configured to secure one or more of the at least one rail or structural extension in and/or to the tower and prevent the one or more of the at least one rail or structural extension from falling below a set height along the tower, the locking mechanism being installable in and/or on the horizontal wind turbine.

17. The kit of claim 16, wherein the one or more mechanisms configured to secure at least one of the advertisement and/or advertising space, the at least one rail or structural extension, and the at least one roller to the tower comprises a plurality of belts secured around the tower, the plurality of belts having (i) a cinching mechanism for adjusting a diameter of the belt as the belt goes up or down the tower and/or (ii) bearings therein configured to allow the advertisement, alone or in combination with the one or more mechanisms, the at least one rail or structural extension and/or the at least one roller, to track a horizontal alignment of the horizontal wind turbine as the advertisement ascends or descends the tower.

18. The kit of claim 16, wherein the locking mechanism comprises one or more solenoids configured to hold the advertisement and/or advertising space to a vertical rail or guide along a height of the tower.

19. The kit of claim 1, further comprising a second rail or structural extension configured to secure a second edge of the advertisement opposite from the first edge of the advertisement.

20. The kit of claim 1, wherein the advertisement and/or advertising space comprises (i) a plurality of blinds or slats, or (ii) a material selected from a plastic and a cloth that includes a plurality of vertical or horizontal stitches configured to break or separate when exposed to a force or pressure at or above a predetermined threshold force or pressure.

* * * * *